(12) United States Patent
Kielsholm Thomsen

(10) Patent No.: US 11,648,666 B2
(45) Date of Patent: May 16, 2023

(54) VIBRATION CONTROL OF SYSTEMS WITH CONFIGURATION DEPENDENT DYNAMICS

(71) Applicant: Universal Robots A/S, Odense S (DK)

(72) Inventor: Dan Kielsholm Thomsen, Hinnerup (DK)

(73) Assignee: UNIVERSAL ROBOTS A/S, Odense S (DK)

( * ) Notice: Subject to any disclaimer, the term of this patent is extended or adjusted under 35 U.S.C. 154(b) by 362 days.

(21) Appl. No.: 16/623,142

(22) PCT Filed: Jul. 12, 2018

(86) PCT No.: PCT/EP2018/068934
§ 371 (c)(1),
(2) Date: Dec. 16, 2019

(87) PCT Pub. No.: WO2019/012040
PCT Pub. Date: Jan. 17, 2019

(65) Prior Publication Data
US 2020/0171658 A1 Jun. 4, 2020

(30) Foreign Application Priority Data
Jul. 13, 2017 (EP) .................................... 17181118

(51) Int. Cl.
*B25J 9/16* (2006.01)

(52) U.S. Cl.
CPC .......... *B25J 9/1635* (2013.01); *B25J 9/1664* (2013.01); *G05B 2219/41226* (2013.01); *G05B 2219/41231* (2013.01)

(58) Field of Classification Search
CPC ................. B25J 9/1635; B25J 9/1664; G05B 2219/41231; G05B 2219/41217; G05B 2219/41226
See application file for complete search history.

(56) References Cited

U.S. PATENT DOCUMENTS 4,477,755 A * 10/1984 Rickert ................ G11B 21/083
318/565
5,159,250 A 10/1992 Jeon et al.
(Continued)

FOREIGN PATENT DOCUMENTS

JP H0818264 B2 2/1996
WO 99/60701 A1 11/1999

OTHER PUBLICATIONS

Tzes; "An Adaptive Input Shaping Control Scheme for Vibration Suppression in Slewing Flexible Structures"; IEEE Transactions on Control Systems Technology; vol. 1, No. 2; Jun. 1993; pp. 114-121 (Year: 1993).*

(Continued)

*Primary Examiner* — Stephen Holwerda
(74) *Attorney, Agent, or Firm* — Burns & Levinson LLP

(57) ABSTRACT

A method is provided for vibration suppression, which is useful in systems with configuration dependent dynamic parameters. The method is a general and practical solution for obtaining a set of inputs to a dynamic system, which will result in reduced vibrational behavior. A novel discrete time buffer implementation is employed, which yields reduced vibration due to a constant unity sum of applied impulses. The method includes shaping a position input with a continuously updated filter and using numerical differentiation to obtain consistent feedforward derivatives without phase shift.

24 Claims, 24 Drawing Sheets

(56) References Cited

U.S. PATENT DOCUMENTS

| | | | |
|---|---|---|---|
| 5,205,163 A | 4/1993 | Sananikone | |
| 5,594,309 A * | 1/1997 | McConnell | B25J 9/163 318/568.22 |
| 5,638,267 A | 6/1997 | Singhose et al. | |
| 5,917,300 A | 6/1999 | Tanquary et al. | |
| 5,988,411 A | 11/1999 | Singer et al. | |
| 6,163,116 A | 12/2000 | Tanquary et al. | |
| 6,314,473 B1 | 11/2001 | Singer et al. | |
| 6,505,085 B1 * | 1/2003 | Tuttle | B25J 9/1605 700/28 |
| 6,560,658 B2 | 5/2003 | Singer et al. | |
| 6,829,207 B1 | 12/2004 | Singer | |
| 7,330,414 B2 | 2/2008 | Singer | |
| 7,433,144 B2 | 10/2008 | Singer | |
| 7,483,232 B2 | 1/2009 | Singer et al. | |
| 7,620,739 B2 | 11/2009 | Singer et al. | |
| 7,791,758 B2 | 9/2010 | Singer et al. | |
| 8,144,417 B2 | 3/2012 | Singer et al. | |
| 2009/0154001 A1 | 6/2009 | Singer et al. | |
| 2010/0145521 A1 | 6/2010 | Prisco et al. | |
| 2010/0309490 A1 | 12/2010 | Singer et al. | |
| 2012/0176875 A1 | 7/2012 | Singer et al. | |

OTHER PUBLICATIONS

Communication Pursuant to Article 94(3) EPC for European Application No. 18737298.2, dated Nov. 12, 2021, (8 pages).

Biagiotti, Luigi et al., "Trajectory Planning for Automatic Machines and Robots". Berlin, DE: Springer, 2008. 515 pages. Print.

Hastings, Gordon G. et al., "A Linear Dynamic Model for Flexible Robotic Manipulators". In: IEEE Control Systems Magazine (Feb. 1987 ed.) 4 pages, pp. 61-64.

Pestel, Eduard C. et al., "Matrix Methods in Elastomechanics". New York: McGraw-Hill Book Company, 1963. 452 pages, Print.

Rui, Xiaoting et al., "Transfer matrix method for linear multibody system". In: Springer Science+Business Media B.V. (Oct. 2007) 29 pages, pp. 179-207.

Khalil, Wisama et al., Modeling of Mechanical Systems with Lumped Elasticity, IEEE International Conference on Robotics and Automation Proceedings, 7 pages, pp. 1-7. (Feb. 2000).

Cetinkunt, Sabri et al., "Symbolic Modeling and Dynamic Simulation of Robotic Manipulators with Compliant Links and Joints". In: The International Journal of Robotics and Computer-Integrated Manufacturing (May 1988 ed) 23 pages, pp. 1-23.

Kalra, Parveen et al., "Accurate Modelling Of Flexible Manipulators Using Finite Element Analysis." In: Mech. Mach. Theory, vol. 26, No. 3, p. 299-313 (1991).

Geradin, M. et al., "Kinematics and dynamics of rigid and flexible mechanisms using finite elements and quaternion algebra", In: Computational Mechanics, vol. 4, p. 115-135 (1989).

Laakso, Timo I. et al., "Splitting Tools for Fractional Delay Filer Design". In: IEEE Signal Processing Magazine (Jan. 1996 ed.) 30 pages, pp. 30-60.

Beazal, Victor Maxell. A Thesis Submitted to the Faculty of Purdue University: "Command Shaping Applied to Nonlinear Systems with Configuration-Dependent Resonance". Ann Arbor, MI: ProQuest information and Learning Company, Aug. 2004, 160 pages, Print.

Singhose, Wiliam E. et al., "A Comparison of Input Shaping and Time-Optimal Flexible-Body Control". Dept. of Mechanical Engineering, Massachusetts Institute of Technology, Cambridge, MA, USA (wesing@MIT.EDU), (1997) 9 pages.

Hyde, James M. et al., "Using Input Command Pre-Shaping to Suppress Multiple Mode Vibration", IEEE International Conference on Robotics and Automation Proceedings, Sacramento, CA. (Apr. 1991). 6 pages, pp. 2604-2609.

Murphy, Brett R. et al., "Digital Shaping Filters for Reducing Machine Vibration". In: IEEE Transactions on Robotics and Automation, vol. 8, No. 2, 5 pages, pp. 285-289 (Apr. 1992).

Hubinsky, Peter, et al., "Reducing Oscillations During Positioning Of a Servomechanism Having Flexibility". In: Journal of Electrical Engineering, vol. 63, No. 4, 12 pages, pp. 201-212 (2012).

Tokhi, M. O. et al., "Flexible Robot Manipulators Modelling, simulation and control". London, UK: The Institution of Engineering and Technology, 2008. 569 pages. Print.

Kurfess, Thomas R., "Robotics and Automation Handbook". Boca Raton, US: CRC Press LLC., 2005. 579 pages. Print.

Chatlatanagulchai, Withit et al., "Command Shaping Applied to a Flexible Robot with Configuration-Dependent Resonance", 2006 American Control Conference Proceedings, Minneapolis, MN. (Jun. 14-16, 2006). 6 pages, pp. 1766-1771.

Kinceler, Roberto et al.,"Corrective Input Shaping for a Flexible-Joint Manipulator", 1997 American Control Conference Proceedings, Albuquerque, NM. (Jun. 1997). 5 pages, pp. 1335-1339.

Chang, Pyung Hun et al.,"Time-varying input shaping technique applied to vibration reduction of an industrial robot", Control Engineering Practice. (2005). 10 pages, pp. 121-130.

Park, Hyung-Soon et al.,"Time-Varying Input Shaping Technique Applied to Vibration Reduction of an Industrial Robot", 1999 IEEE international Conference on Intelligent Robot Systems Proceedings, Kyongju, South Korea. (Oct. 17-21, 1999). 6 pages, pp. 285-290.

Tzes, Anthony, et al., "An Adaptive Input Shaping Control Scheme for Vibration Suppression in Slewing Flexible Structures". In: Transactions on Control Systems Technology. (Jun. 1983 ed.), vol. 1, No. 2. 8 pages, pp. 114-121.

Cho, Jung-Keun et ai.,"Vibration reduction in flexible systems using a time-varying impulse sequence", In: Robotica, vol. 13. 9 pages, pp. 305-313. Cambridge University Press. (1995).

Park, Cheol Hoon, et al., "Vibration Control of Flexible Mode for a Beam-Type Substrate Transport Robot". In: International Journal of Advanced Robotic Systems. (Oct. 2009), vol. 10. 7 pages, pp. 1-7.

Singhose, Wiliam, "Command Shaping for Flexible Systems: A Review of the First 50 Years". In: International Journal of Precision Engineering and Manufacturing. (Oct. 2009 ed ), vol. 10, No. 4. 16 pages, pp. 153-168.

Magee, David P. et Al., "The Application of Input Shaping to a System with Varying Parameters", 1992 Japan-USA Symposium on Flexible Automation Proceedings, San Francisco, CA. (Jul. 13-15, 1992). 21 pages, pp. 1-21.

Rappole, Bert Whitney Jr. A Thesis Submitted to the Faculty of the Massachusetts Institute ofTechnology, Department of Mechanical Engineering: "Minimizing Residual Vibrations in Flexible Systems". Cambridge, MA: MIT Artificial intelligence Laboratory, 1992. 125 pages, Print.

Vaughan, Joshua et al."Reducing Vibration and Providing Robustness with Multi-input Shapers", 2009 American Control Conference Proceedings, St. Louis, MO. (Jun. 10-12, 2009). 6 pages, pp. 184-189.

Pao, Lucy Y. et al., "Multi-input shaping design for vibration reduction". In: Automatica. (1999), vol. 35. Elsevier Science Ltd. 9 pages, pp. 81-89.

Tuttle, Timothy D. et al., "A Zero-placement Technique for Designing Shaped Inputs to Suppress Multiple-mode Vibration", 1994 American Control Conference Proceedings, Baltimore. MD. (Jun. 29-Jul. 1, 1994). 5 pages, pp. 2533-2537.

Shan, Jinjun et al., "Modified input shaping for a rotating single-link flexible manipulator". In: Journal of Sound and Vibration. (2005), vol. 285. Elsevier Science Ltd. 21 pages, pp. 187-207.

Singhose, Wiliam E. et al., "Input Shaping for Vibration Reduction with Specified Insensitivity to Modeling Errors", 1996 Japan-USA Symposium on Flexible Automation Proceedings, Boston, MA. (Jul. 7-10, 1996). 7 pages, pp. 1-7.

Singhose, William E. et al., "Vibration Reduction Using Multi-Hump Extra-Insensitive Input Shapers", 1995 American Control Conference, Seattle, WA. (Jun. 21-23, 1995). 5 pages, pp. 1-5.

Singhose, William E. et al., "Residual Vibration Reduction Using Vector Diagrams to Generate Shaped Inputs". In: Journal of Mechanical Design. (Jun. 1994), vol. 116. 6 pages, pp. 654-659.

(56) References Cited

OTHER PUBLICATIONS

Singhose, William E. et al., "Shaping Inputs to Reduce Vibration: A Vector Diagram Approach", IEEE International Conference on Robotics and Automation Proceedings, Cincinnati, OH. (May 13-18, 1990). 6 pages, pp. 922-927.

Singer, Neil C. et al., "Preshaping Command Inputs to Reduce System Vibration" Advanced Research Projects Agency: Artificial Intelligence Laboratory Report 1027. Massachusetts Institute of Technology Artificial Intelligence Laboratory. Arlington VA. (Jan. 1988). 28 pages.

Singer, Neil C. et al., MIT Artificial Intelligence Laboratory Technical Report 1030: "Residual Vibration Reduction in Computer Controlled Machines". Cambridge, MA: MIT Department of Mechanical Engineering. (Feb. 10, 1989). 248 pages, Print.

Smith, Otto J. M. "Feedback Control Systems". New York, NY: McGraw-Hill Book Company, Inc., 1958. (724 pages). Print.

Smith, Otto J. M. "Posicast Control of Damped Oscillatory Systems", In: Proceedings of the IRE. (Sep. 1957), vol. 45, Issue 9. IEEE. 7 pages, pp. 1249-1255.

International Organization for Standards (ISO). "ISO 8373: Robots and robotic devices—Vocabulary", 2nd edition. ISO. (Mar. 1, 2012). 48 pages.

Notice of Reasons for Rejection for Japanese Application No. 2019-572395, dated Aug. 2, 2022, (with English translation) (7 pages).

International Preliminary Report on Patentability for International Patent Application No. PCT/EP2018/068934, dated Jan. 14, 2020, (22 pages).

International Search Report for International Patent Application No. PCT/EP2018/068934, dated Oct. 30, 2018, (7 pages).

Written Opinion for International Patent Application No. PCT/EP2018/068934, dated Oct. 30, 2018, (21 pages).

Matthew O T Cole: "A discrete-time approach to impulse-based adaptive input shaping for motion control without residual vibration", Automatica, Pergamon, Amsterdam, NL, vol. 47, No. 11, May 5, 2011 (May 5, 2011), pp. 2504-2510, XP028308545, ISSN: 0005-1098, DOI: 10.1016/J.AUTOMATICA.2011.08.039 [retrieved on Aug. 20, 2011] abstract Sections 1 to 4.

Pavel Holoborodko: "Central Differences", Feb. 20, 2009 (Feb. 20, 2009), pp. 1-17, XP002781793, Retrieved from the internet: URL:http://www.holoborodko.com/pavel/numerical-methods/numerical derivative/central-differences/[retrieved on Aug. 8, 2018] p. 1-p. 3.

"Chapter Seven: Differentiation and Integration" In: S.D. Conte. C. de Boor. "Elementary Numerical Analysis. An algorithmic Approach", McGraw-Hill Book Company, USA, pp. 294-302 (Jan. 1, 1980) [XP002781792] ISBN: 0-07-012447-7.

Notice of Grounds for Rejection for Korean Patent Application No. 10-2019-7038688, dated Nov. 29, 2022, (7 pages).

\* cited by examiner

VIBRATION CONTROL OF SYSTEMS WITH CONFIGURATION DEPENDENT DYNAMICS

CROSS-REFERENCE TO RELATED APPLICATIONS

This application is a national stage entry of PCT Application No. PCT/EP2018/068934, which was filed on Jul. 12, 2018. PCT Application No. PCT/EP2018/068934 claims priority to European Patent Application No. EP17181118.5, which was filed on July. 13, 2017. This application claims priority to PCT Application No. PCT/EP2018/068934 and to European Patent Application No. EP17181118.5. The contents of PCT Application No. PCT/EP2018/068934 and of European Patent Application No. EP17181118.5 are incorporated herein by reference.

FIELD OF THE INVENTION

The present invention pertains to a method of vibration suppression for systems with configuration-dependent dynamic parameters.

BACKGROUND OF THE INVENTION

The requirements for mechanical systems in terms of high velocities and light weight structures are continuously pushing the limits of current motion control technologies. Light weight structures are desired in various situations such as highspeed operation, mobile equipment, energy efficient mechanisms and large structures. A light weight structure introduces elastic behavior to the system, which results in dynamic responses including oscillating motions such as mechanical vibrations during and after a motion task. Mechanical vibrations affect system precision and productivity in a negative way, hence it is desired to minimize the amount of vibrations.

One industry that sees a trend of shifting from heavy and rigid design towards light weight structures with a higher degree of mechanical flexibility is robotics. The latest development in robotics includes the new area called collaborative robots [1]. Collaborative robots are robots that are designed for direct interaction with a human. In contrast to the traditionally heavy cast iron structure industrial robots [1], collaborative robots are often designed to have low mass and inertia properties to reduce the amount of kinetic energy stored in the robots during motion. This reduces the risk of human or material damage in an impact situation. However, the reduced mass and inertia often results in both reduced stiffness and reduced damping of the system, thereby increasing system vibrational behavior.

The problem of reducing the amount of system vibration has been addressed intensively through the last decades. Generally, the different approaches can be split up into three large groups; hardware design, closed loop vibration control and open loop vibration suppression.

Vibration reduction by hardware design normally includes mechanical design optimization, that attempts to reduce vibrational behavior through high stiffness and damping or design to avoid eigenfrequencies in the area of frequencies for potential cyclic load scenarios.

The closed loop approach to vibration free motions is the most widespread. This includes feedback control, i.e. use of observations such as sensor data from the real system to reduce error compared to a desired system state. Effective closed loop vibration suppression often includes complex control structures and additional sensors such as accelerometers. A big disadvantage in closed loop vibration suppression is that sensor noise can be amplified into the increased system vibration.

In contrast to closed loop approaches to vibration reduction, open loop vibration control relies on predicting the behavior of the system and taking the predictions into account when forming the input to the system. Due to the predictive behavior, open loop vibration suppression can generally be designed to be more responsive than closed loop vibration control. An open loop vibration reduction method also makes it possible to use a simpler control structure while avoiding the need for additional sensors, hence achieving an overall simpler system.

Feedforward/Feedback Control

One type of operation for a system, e.g. a robot [1], is to follow a specific position trajectory. For this type of motion, one or more position controllers are implemented. These controllers have the purpose to maintain the target position, which can vary over time. The controllers can include feedforward and feedback functionality. In a feedforward/feedback controller, the feedforward signals complement the main input, such that action can be taken before position errors arise. This makes the controller more responsive.

FIG. 1 illustrates an example of a setup with a target position trajectory generator 101, which is complemented by its derivatives. In the example, q denotes target position, $\dot{q}$ denotes target velocity, $\ddot{q}$ denotes target acceleration, $\tau$ denotes target torque, $I_a$ denotes actual current, $\dot{q}_a$ denotes actual velocity and $q_a$, denotes actual position. Together with the derivatives, $\dot{q}$ and $\ddot{q}$, of target position, q, it is possible to perform inverse dynamics 102 and provide the motor controller 103 with a target torque, $\tau$ and regulate the current $I_a$ of the motor(s) of the dynamic system 104 based on the target torque. Ideally this would result in the desired motion. However, feedback control is often still needed to account for uncertainties and disturbances. For this reason, sensor feedback is implemented in the example to return actual velocity, $\dot{q}_a$, and actual position, $q_a$, from the dynamic system to the motor controller.

The controller can only perform well, if its inputs are consistent with each other, i.e. the derivatives are true derivatives and the torque matches the trajectory. Otherwise the controller will attempt to fulfill contradictory targets, resulting in generally higher errors compared to target inputs and higher levels of vibration. Hence if a type of filter is applied to any of the inputs to reduce vibration, i.e. modifies that specific input, then the other inputs must be modified accordingly to be consistent with the filtered one.

Command Shaping

One approach to eliminating vibrations that has received extensive attention in recent research is command shaping. Command shaping is also referred to as reference shaping. With command shaping, the system inputs are intelligently formed, such that the system vibratory modes are cancelled out. One of the earliest descriptions of command shaping was called posicast control and was presented by Smith in 1957 [2, 3] same time as Calverts Patent on a similar method [4]. Before posicast control similar approaches were implemented in CAM profile design, but Smith presented the first structured description of a command shaping process.

The basic idea of posicast control is to split the input signal into two components and give a time delay to one part of the system input. The non-delayed input component will introduce vibrations in the system. The delayed component will cancel out the vibrations with correct timing and magnitude. For a simple input, consisting of an impulse, to a second order dynamic system with damping, an example of the posicast principle is illustrated in FIG. 2, where a first impulse with magnitude $A_1$ is provided a time 0 and a second impulse with magnitude $A_2$ is provided at time 0.5. The first vibration response 205 due to the first impulse with magnitude $A_1$ is illustrated in dashed line and the second vibration response 206 due the second impulse with magnitude $A_2$ is illustrated in dotted line. The total vibration response 208 is illustrated in solid line and it can be seen, that the first vibration response and the second vibration response cancel each other out. The method is intended for suppressing vibrations of a single vibration mode.

In 1990 Singer and Seering presented a more general description of posicast control which today is mainly referred to as input shaping [5, 6]. They described a method of determining a set of constraint equations to solve for in order to achieve a set of vibration free impulses. The constraints include constraints of vibration amplitude. The simplest input shaping method with two impulses is called zero vibration (ZV) shaping. ZV shaping is just a more general approach to posicast control. They also described how to constrain the derivative of vibration amplitude in the frequency domain to increase robustness to modeling error. This method yields a set of three impulses and is called zero vibration and derivative (ZVD) shaping. To increase robustness even more, any number of derivatives can be included in the constraints, leading to ZVDD shapers, ZVDDD shapers, etc. Every time an extra derivative is included in the constraints, an extra impulse is needed to comply with the constraints. The cost of adding extra impulses is increased time of motion duration.

The scaling and timing of the input components are described by these impulse trains consisting of the magnitudes, $\vec{A}$, and the delays, $\vec{\Delta}$, of the impulses. For input shaping in general, the impulse train consist of n impulses, n being a positive integer. An impulse train consisting of n impulses is presented as in eq. 1-eq. 2.

$$\vec{A} = \{A_1\ A_2\ \ldots\ A_n\} \quad \text{eq. 1}$$

$$\vec{\Delta} = \{\Delta_1\ \Delta_2\ \ldots\ \Delta_n\} \quad \text{eq. 2}$$

An example of an impulse train 309 with n=3 is illustrated in FIG. 3, where a first impulse with magnitude $A_1$ is provided at time $\Delta_1$, a second impulse with magnitude $A_2$ is provided at time $\Delta_2$, a third impulse with magnitude $A_3$ is provided at time $\Delta_3$.

An example of a 3-impulse train response is illustrated in FIG. 4, where the impulse with magnitude $A_1$ is provided a time $\Delta_1=0$, the second impulse with magnitude $A_2$ is provided at time $\Delta_1=0.5$ and the third impulse with magnitude $A_3$ is provided at time $\Delta_2=1$. The first vibration response 305 due to the first impulse with magnitude $A_1$ is illustrated in dashed line, the second vibration response 306 due to the second impulse with magnitude $A_2$ is illustrated in dotted line and the third response 307 due to the third impulse with magnitude $A_2$ is illustrated as small circles. The total vibration response 308 is illustrated in solid line and it can be seen that the first vibration response, the second vibration response, and the third vibration response cancel each other out after time $\Delta_2=1$.

The illustrated 3 impulse shaper of FIG. 4 is of the type ZVD.

Multiple methods have been developed for establishing vibration free impulse trains for a system with known dynamics. This includes for example shapers with high robustness to modeling errors [7, 8, 9, 10, 11, 12], multi-mode shapers [13], multi-input system shapers [14, 15] and time-varying shapers [16, 17]. [18] describes other impulse generation schemes, including negative magnitude impulses. The method called extra insensitive (EI) shapers are introduced, which does not constraint the vibration amplitude to be exactly zero, but some accepted value. This results in increased robustness modeling error. [19] utilize staggered posicast filters to increase robustness. [20] introduce optimal arbitrary time-delay (OAT) filtering. OAT filtering includes negative impulse magnitudes and potentially large magnitude impulses in order to obtain fast responses. [21] combines input shaping and smooth baseline function command shaping. Here input shaping is used to suppress the vibrations at a specific frequency and the smooth baseline function command shaping is implemented to reduce the effects of higher frequencies. [22] presents a method of input shaping for harddisk drives including negative impulse magnitudes and feedback inverse shaping.

Common for all impulse train establishing methods is that eigenfrequencies and damping ratios must be estimated by either modeling, look-up tables, measurements or a combination, and that a set of constraint equations is solved to obtain the impulse magnitudes and delays. For example the constraints may include constraining residual vibration amplitude, impulse magnitude, robustness to frequency error and robustness to damping error [23]. Once a set of vibration free impulses are known, any system input can be modified to yield vibration free system motions. This modification process is called shaping. The process of shaping the input signal is defined as the convolution of the initial input signal and the impulse train. This convolution with an impulse train is described by eq. 3, where q(t) is the input as a function of time and q*(t) is the shaped input as a function of time.

$$q^*(t) = \sum_{i=1}^{n}(A_i \cdot q(t - \Delta_i)) \quad \text{eq. 3}$$

An example of shaping a rest-to-rest position curve is illustrated in FIG. 5, where the rest-to-rest position curve illustrates a movement from 0 to 1. In FIG. 5 chart 510 illustrates the unshaped input signal 511 as function of time and chart 512 illustrates the shaped input signal 513 as function of time. The unshaped input signal is convoluted with an impulse train comprising a first impulse with magnitude $A_1$ provided a time 0 and a second impulse with magnitude $A_2$ provided at time 0.8. The part of the shaped input signal originating from the convolution of the first impulse is illustrated in dashed line 514 and the part of the shaped input signal originating from the convolution of the second impulse is illustrated in dotted line 515.

Today input shaping is widely used in systems like cranes, harddisk drives and measuring machines. Common for this type of systems is that they have well known and constant or slowly changing dynamics.

Shaping of Multiple Dependent Inputs

For a time-invariant input shaping filter it is possible to filter the position and all derivatives with the identical shapers as illustrated in FIG. 6 and they will still be consistent. The outputs q, q̇ and q̈ from the target position trajectory generator 101 can thus be filtered by an input shaping filter 616 resulting in the shaped position q* and its derivatives q̇* and q̈*, which are used as inputs to the inverse dynamics 102 and the motor controller 103 of FIG. 1. For example, this approach is implemented in [24]. The methodology of shaping all inputs with identical shapers resolves the problem of consistent feedforward inputs for a feedforward controller. However, this is not possible if the filter is time-varying, as it would result in inconsistent derivatives. In the following sections, this challenge will be described further.

Time-Varying Input Shaping

Traditional input shaping is readily implemented in time-invariant systems, i.e. systems with non-varying dynamic properties. However multiple systems have dynamics, that are changing with position or over time. Examples of time-varying dynamics are found in systems with one degree of freedom or more. Several things are contributing to time-varying behavior, mainly varying mass distribution (inertia), non-linear stiffness, time-varying damping and time-varying payload. An industrial robot [1] is a great example of a system with configuration dependent dynamics. Here configuration being actuator positions. Hence effective vibration control strategies in robotics must be able to handle time-varying dynamics, e.g. in industrial robots and collaborative robots.

The time-varying dynamics means non-constant eigenfrequencies and damping ratios. An efficient vibration suppression method must be able to handle this time-varying behavior. The idea of accounting for time-varying dynamics is introduced in [6]. Since then different approaches to time-varying input shaping have been presented. The term time-varying input shaping covers an input shaping method, where the timing and/or scaling of the impulse train are varying over time. This makes it possible to account for time-varying dynamics of the controlled system. The first time-varying impulse sequences were introduced in the 1990's [16, 17, 25, 26]. Park and Chang implemented time-varying input shaping in a heavy duty industrial robot using a simplified dynamic model for frequency estimation based on joint elasticity [27, 28].

By using either dynamic modeling, frequency tables, measurements, or a combination of aforementioned the eigenfrequencies and/or damping ratios are estimated for each time step and the impulse train is updated accordingly.

Others have presented different types of segmented input shaping [29, 30, 31, 32]. Segmented input shaping does not update the impulse train every time step, but only with certain intervals. The main advantage of segmenting is to avoid implementation problems, that occur for the discrete time implementation, which will be addressed in next section. The segmentation yields jumps in the system input if the system is not in a steady state when impulse train is updated. The segmentation results in significantly longer duration of the motion, which is undesired.

Discrete time Implementation

When implementing input shaping in a real time application, most likely a discrete time implementation is needed. By its nature the input shaping method has limitations, when working in discrete time. These limitations arise from the fact, that it is desired to delay parts of the system input by certain amounts of time, and this amount will almost certainly not fit one of the discrete time steps, unless the time increments are specifically designed to suite the input shaping implementation.

The common implementation of input shaping utilizes a buffer of future filter outputs, wherein the input is scaled by $\vec{A}$ into n parts. Each scaled part is delayed with respect to $\vec{\Delta}$ and added to the buffer as illustrated in FIG. 7A and 7B [16, 17] illustrating a discrete shaped input signal 720 resulting from convolving a discrete input signal 718 with a discrete impulse train 719. FIG. 7A illustrates the signals at time step 0 and FIG. 7B illustrates the signals after time step 6. The discrete shaped input signal 720 comprises contributions (illustrated in dark gray) originating from the convolution of the discrete input signal 718 with the first impulse with magnitude $A_1$ of the impulse train and contributions (illustrated in light gray) originating from the convolution of the discrete input signal 718 with the second impulse with magnitude $A_2$ of the impulse train. When convolving the impulse sequence with a discrete time input signal, it corresponds to the type of digital filter usually referred to as a Finite Impulse Response (FIR) filter. Today this is still the agreed method of implementing input shaping [33, 34, 35]. Using this implementation, the system dynamics are estimated and the impulse train is updated before adding the filter input to the output buffer. The dynamics can for example be estimated based on filter input, actual configuration or sensor readings. None of the aforementioned dynamics estimation approaches are really preferable, since all of them are estimating the system dynamics at the time of input, rather than at the time of impulse action. For time-varying filters, the time discretization is a challenge, because changes in impulse timing will make the impulse jump from one time step to another and thereby introduce jumps or spikes in the filter output, when this occurs.

The problem of non-precise impulse timing occurring due to discrete time implementation has been addressed by Murphy [36]. He presented an approach to resolve the problem by splitting the impulse into two and apply them in adjacent time steps. Murphys impulse splitting requires evaluating a large number of trigonometric functions, which represent computationally heavy computations. Similar solutions of splitting the impulses into adjacent discrete time steps have been proposed, e.g. linear extrapolation [16], exact numerical solutions using optimization methods [37], and exact analytic expressions with the discretization as constraints [18]. The principle of buffering future filter output with impulse splitting is illustrated in FIG. 8, where a discrete input signal 818 is convolved with an impulse train 809, which is described in continuous time. The discrete time steps are illustrated as dots 821 below the impulse train and impulses with magnitudes $A_2$ and $A_3$ of the impulse train are provided at a time between two discrete time steps. In order to solve this impulses with magnitudes $A_2$ and $A_3$ are split into the adjacent discrete time steps, between which the impulses should be provided, as illustrated by the arrows. The output corresponds to a discrete shaped input signal obtained by convolving the discrete input signal 818 with an impulse train where the impulses have been split into discrete time steps.

SUMMARY OF THE INVENTION

The object of the present invention is to address the above described limitations with the prior art or other problems of the prior art. This is achieved by the method of generating input for a physical system and a robot according to the independent claims, where a modified input signal for the physical system/robot is provided by convolving at least a part of an input buffer with an impulse train, where the input buffer comprises past inputs of an input signal for the physical system/robot and where the impulse train is generated based on the dynamic properties of the physical system/robot. Hereby the vibrations of the physical system/robot can be reduced under conditions with varying dynamic properties of the physical system/robot.

The dependent claims describe possible embodiments of the robot and method according to the present invention.

Further advantages and benefits of the present invention are described in the detailed description of the invention.

Further the present invention is a general and practical solution to obtaining a set of inputs to a dynamic system, which will result in reduced vibrational behavior. The inventors have found that a new discrete time buffer implementation should be employed, which yields reduced vibration due to constant unity sum of applied impulses.

A position input is shaped and numerically differentiated using central difference differentiation to obtain consistent feedforward derivatives without phase lag have also been provided.

BRIEF DESCRIPTION OF THE DRAWINGS

For a more complete understanding of the invention, reference is made to the following description and accompanying drawings, in which.

DETAILED DESCRIPTION OF THE INVENTION

In the present invention, the system dynamic parameters and the corresponding impulse train are updated in each time step with respect to the current configuration. This is performed in contrast to any segmentation strategy to ensure that it will always be possible to make sudden changes to the trajectory without inducing vibrations to the system. Also, it will be described how updating the impulses in every time step opens opportunities to determine shaped input derivatives with filter time variations taken into account.

However, the shaped position is unknown when the impulse train is updated. The shaped position and impulse train could be solved for, but it is often sufficient to assume small changes in system dynamics between two time steps, so the system dynamics of the shaped position of previous time step can be used to establish the set of impulses.

Integrating Shaped Acceleration

Figure 1:
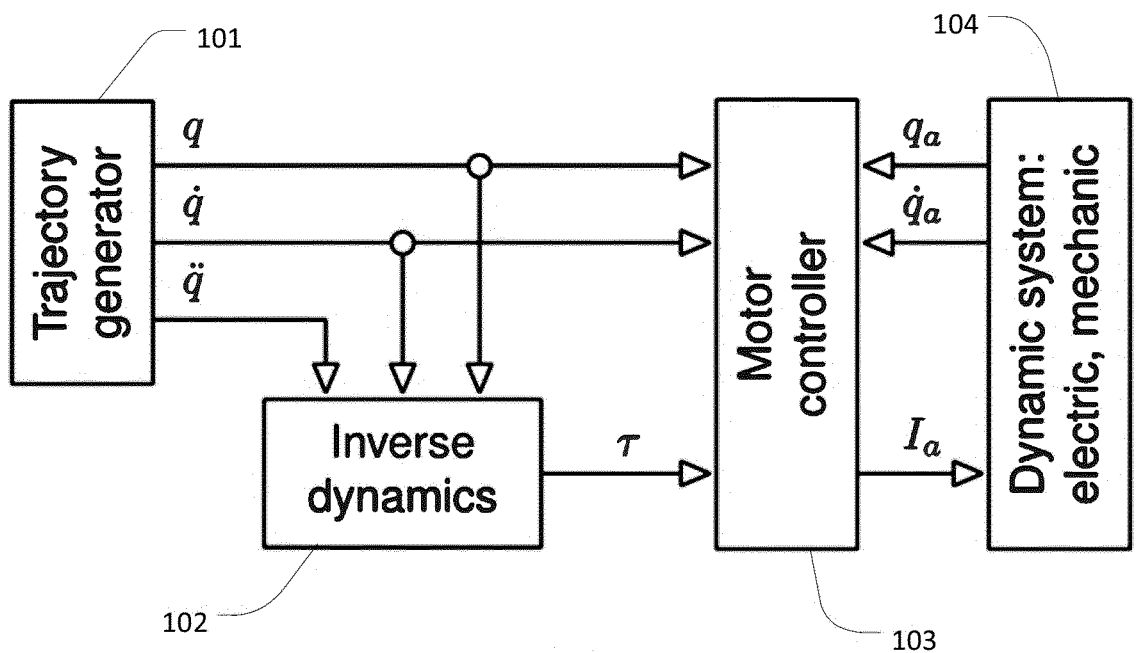
FIG. 1 illustrates a system with feedforward derivatives.
Figure 2:
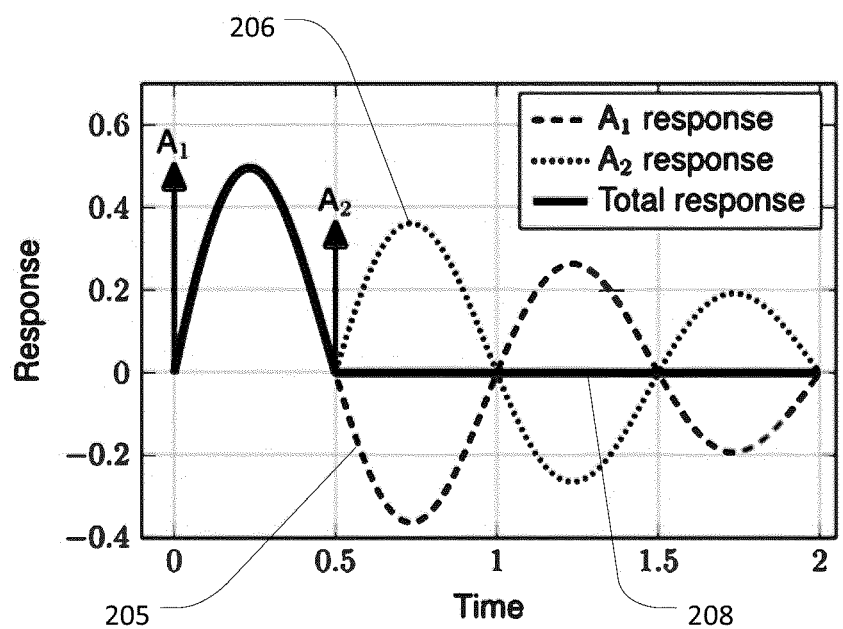
FIG. 2 illustrates the response of posicast control for a simple impulse input also known as Zero Vibration shaping (ZV shaping)
Figure 3:
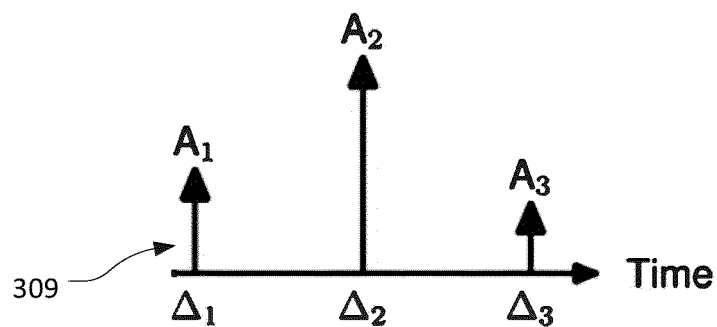
FIG. 3 illustrates an impulse train with 3 impulses.
Figure 4:
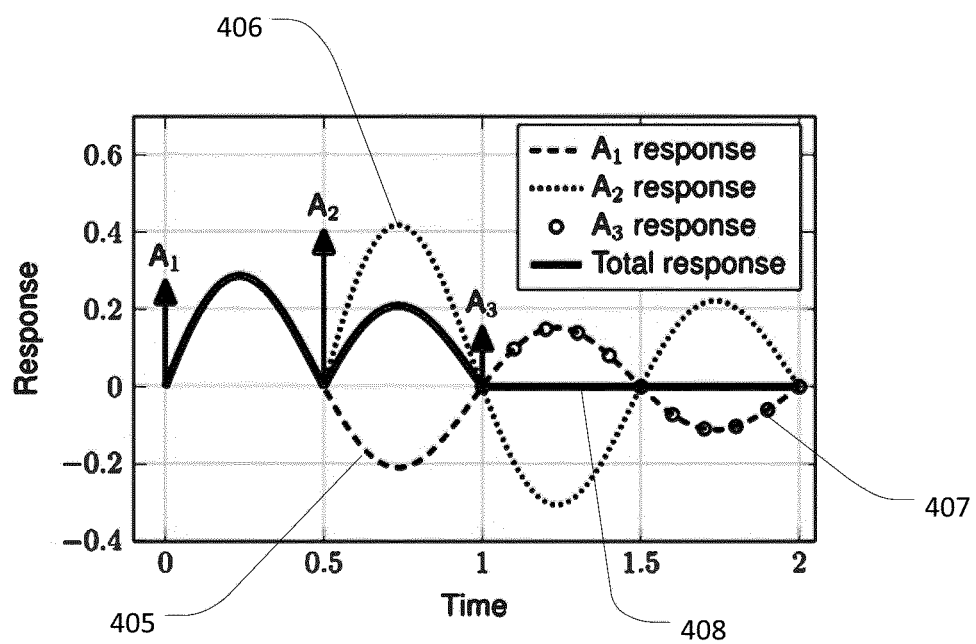
FIG. 4 illustrates the response of Zero Vibration and Derivative shaping (ZVD shaping)
Figure 5:
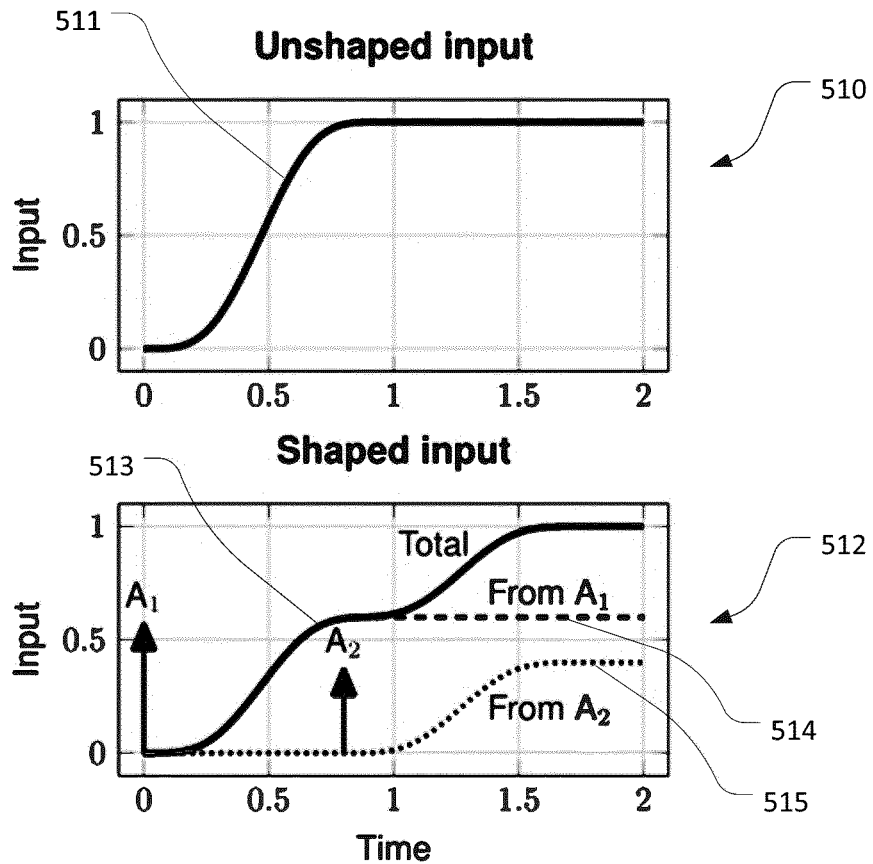
FIG. 5 illustrates the principle of shaping by convolving an input with an impulse train.
Figure 6:
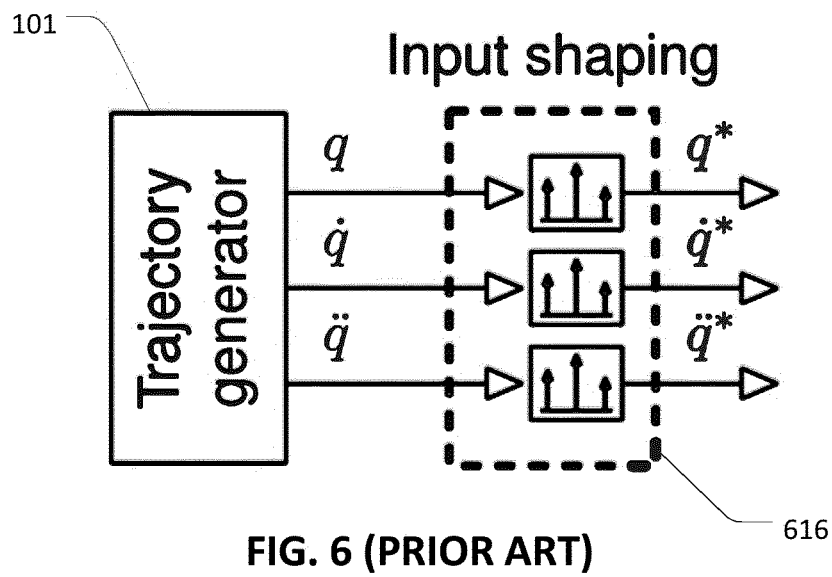
FIG. 6 illustrates the principle of shaping an input with derivatives simultaneously by using identical shaping filters.
Figure 7A:
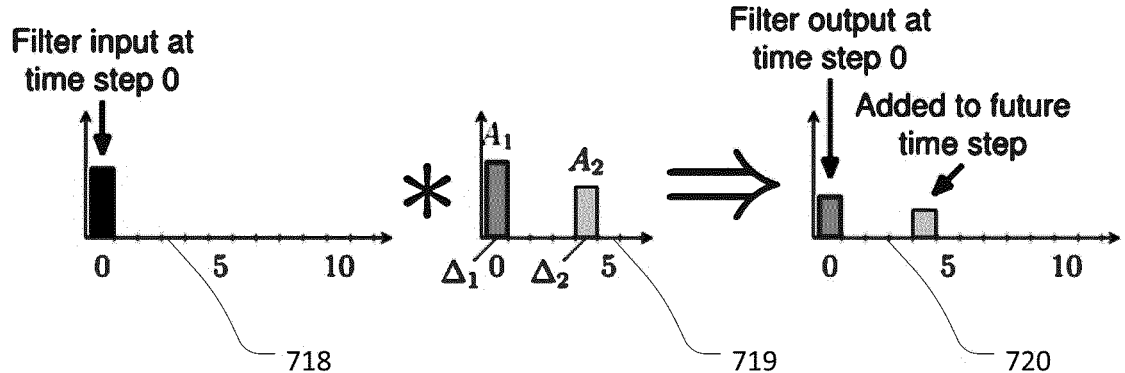
FIG. 7A illustrates the principle of real time convolution with a buffer of future filter outputs at time step 0.
Figure 7B:
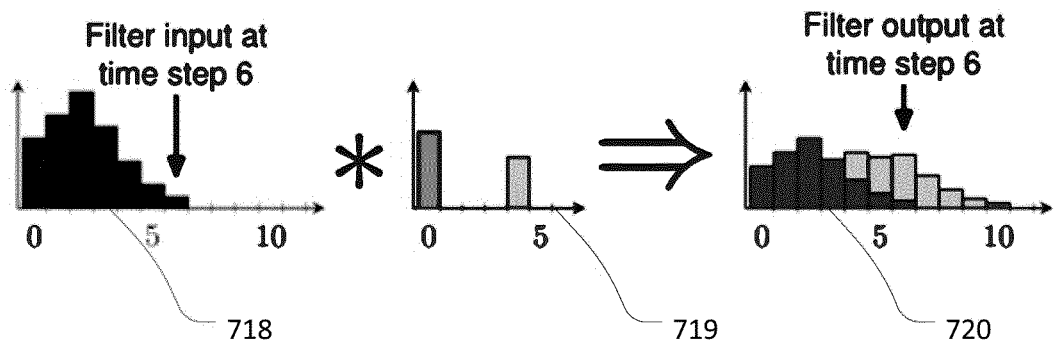
FIG. 7B illustrates the principle of real time convolution with a buffer of future filter outputs at time step 6.
Figure 8:
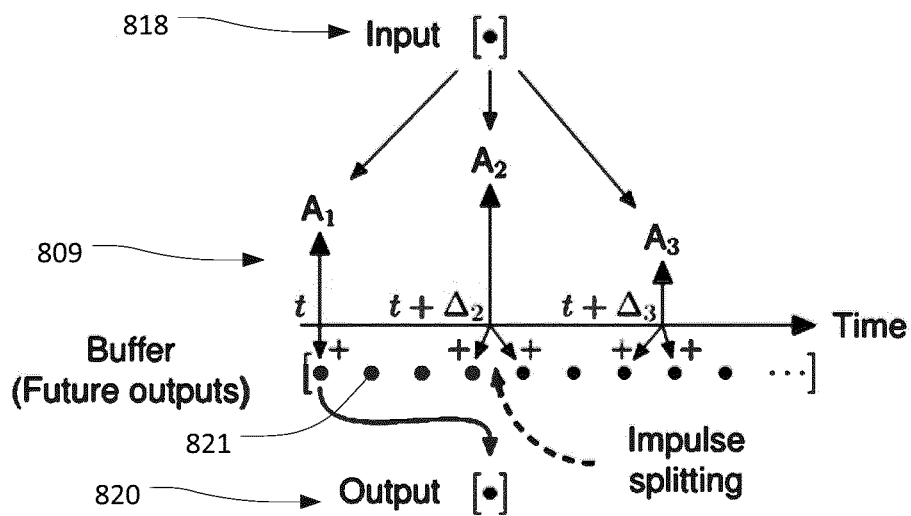
FIG. 8 illustrates the principle of real time convolution with a buffer of future filter outputs and impulse splitting.
Figure 9:
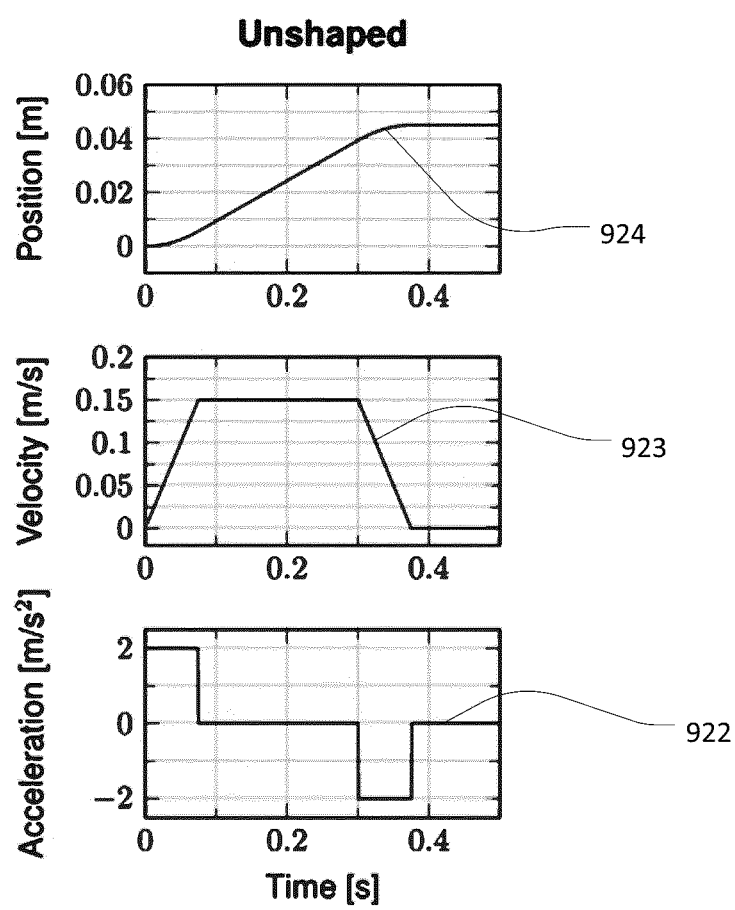
FIG. 9 illustrates unshaped position, velocity and acceleration for a bang-coast-bang acceleration profile.
Figure 10:
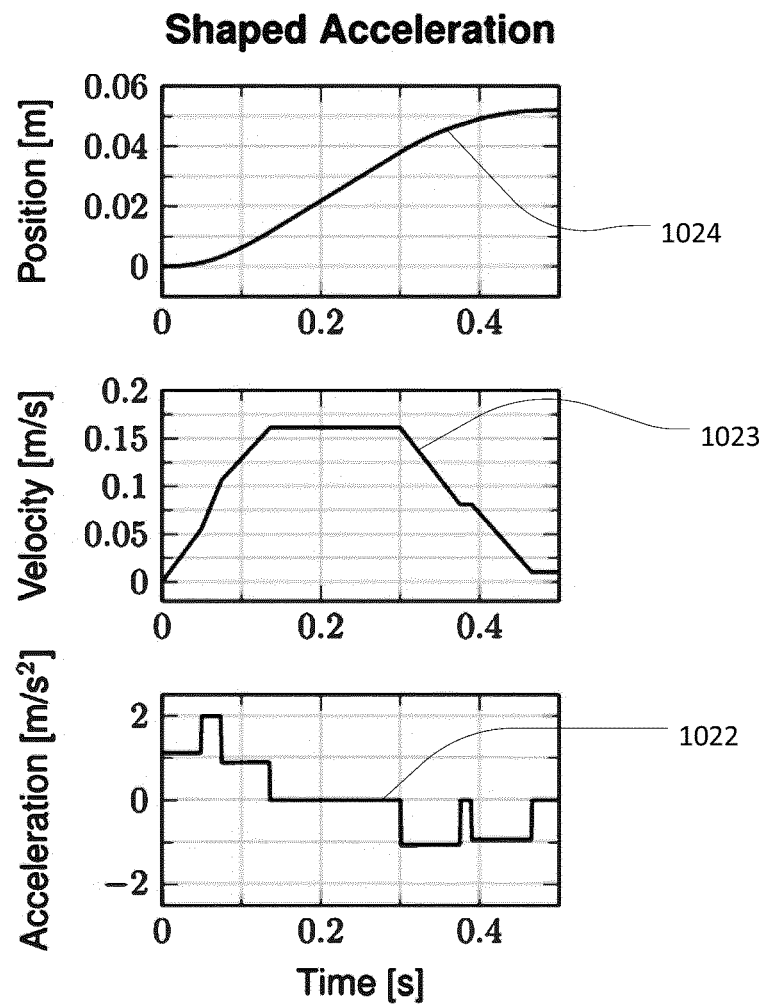
FIG. 10 illustrates position, velocity and acceleration for a bang-coast-bang acceleration profile with shaped acceleration using time-varying input shaping, and velocity and position found through integration of acceleration.

For any system, time-invariant or time-varying, it is possible to shape the acceleration and integrate it to achieve a consistent velocity and position. The common approach is to shape a torque profile, compute acceleration and integrate the acceleration twice to obtain velocity and position, respectively [38, 39, 32]. However, this is not desirable for a time-varying system if a specific end position is desired, as the shaped acceleration integrated twice will not result in the desired position. This behavior is illustrated in an example of a time-varying system with decreasing frequency for increasing position in FIG. 9 and FIG. 10. Here FIG. 9 illustrates the unshaped acceleration 922, velocity 923 and position 924 inputs as function of time, where the velocity 923 has been obtained by integration of the acceleration 922 and the position 924 has been obtained by integration of the velocity 923. FIG. 10 illustrates the shaped input for shaped acceleration 1022, where the velocity 1023 has been obtained by integration of the shaped acceleration 1022 and position 1024 have been determined by integration of the velocity 1023. Notice how the final position of FIG. 10 does not equal the final position of FIG. 9. Notice also how the final velocity of FIG. 10 is non-zero. These phenomena arise from filter variations such that the timing and/or scaling of impulses are varying, hence the acceleration and deceleration phases will not be of equal duration and/or magnitude.

Differentiating Shaped Position

Figure 11:
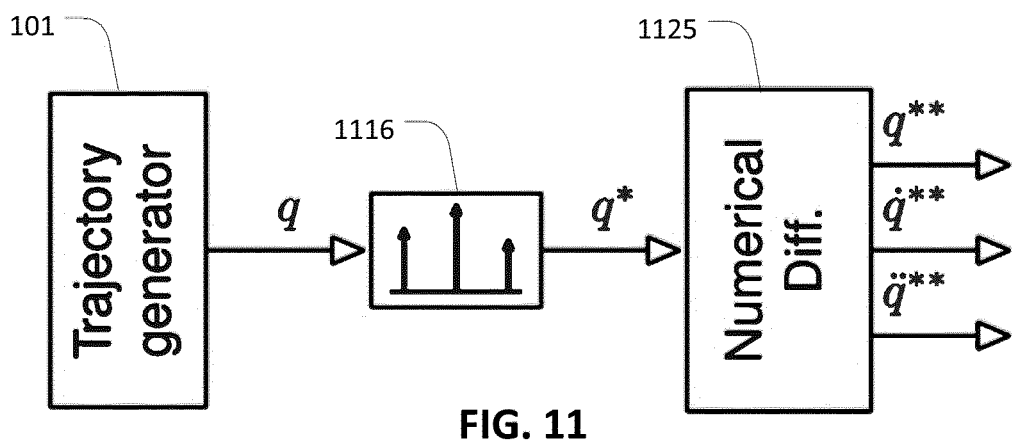
FIG. 11 illustrates the principle of a filter for shaping an input and differentiating filter output numerically to obtain derivatives.
Figure 12:
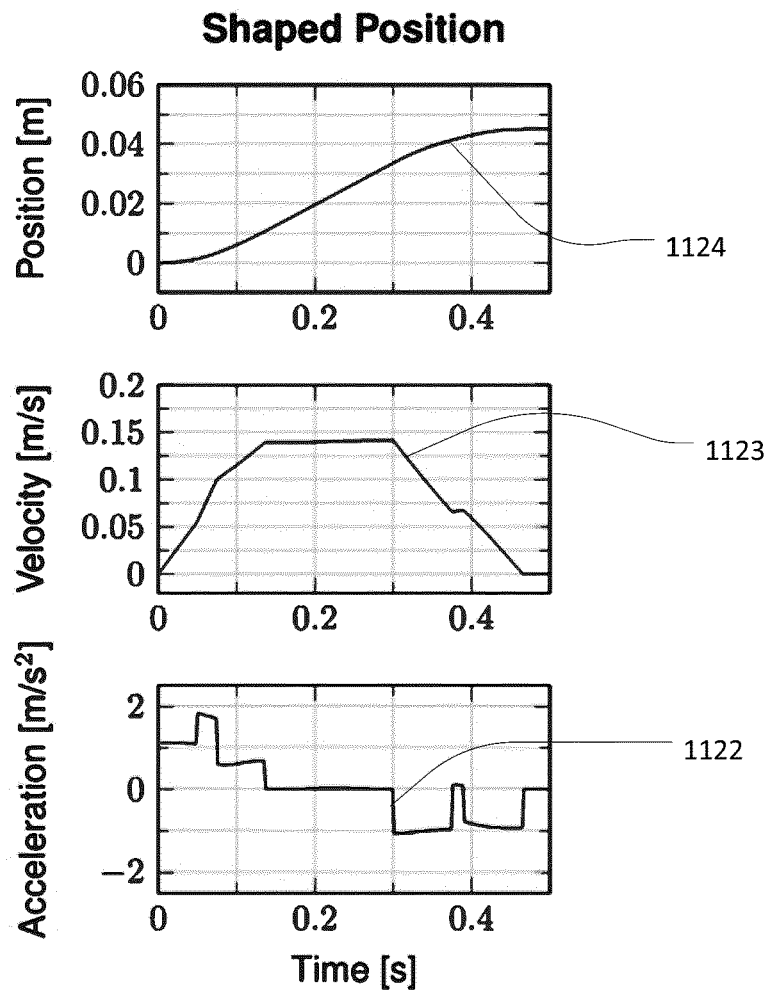
FIG. 12 illustrates position, velocity and acceleration for a bang-coast-bang acceleration profile with shaped position using time-varying input shaping, and velocity and acceleration found through numerical differentiation of position.

To deal with the problem of integrating shaped acceleration, instead the position is shaped and differentiated to obtain its derivatives. Others have differentiated shaped position signals numerically to obtain velocity and acceleration for feedforward purposes, e.g. [40]. The present differentiation structure is illustrated in FIG. 11, where q denotes the target position from trajectory generator 101, q* denotes the shaped position after it has been shaped by input shaping filter 1116, q denotes the shaped position after numerical differentiator 1125, {dot over (q)} denotes the first time derivative of q, and q̈ denotes the second time derivative of q**. The result of shaping position instead of acceleration is illustrated in FIG. 12, illustrating the shaped position 1124, the velocity 1123 obtained by differentiation of the shaped position and the acceleration 1122 obtained by double differentiation of the position 1024. When shaping the position input, the end position will always be the desired end position as long as the sum all impulse magnitudes in $\vec{A}$ is equal to unity, i.e. $\Sigma_{i=1}^{n} A_i = 1$.

The common approach of integrating acceleration has the benefit, that numerical integration results in zero phase shift between position and derivatives, i.e. consistent system inputs. This is not the case for the common approach to numerical differentiation, namely backward difference differentiation. Backward difference differentiation is the most commonly used differentiation approach in signal processing due to its causal system behavior, i.e. dependency on past and current inputs but not future inputs. The method of backward difference differentiation is presented in eq. 4 and eq. 5, where $q_i$ is the current position, $\dot{q}_i$ is the current velocity, $\ddot{q}_i$ is the current acceleration, $D_{back}q_i$ is the backward difference approximation of $\dot{q}_i$, $O(\Delta t)$ is the truncation error, and $\Delta t$ is the time step size.

$$\dot{q}_i = D_{back}q_i - O(\Delta t) \approx D_{back}q_i = \frac{q_i - q_{i-1}}{\Delta t} \qquad \text{eq. 4}$$

$$\ddot{q}_i \approx \frac{D_{back}q_i - D_{back}q_{i-1}}{\Delta t} = \qquad \text{eq. 5}$$

$$\frac{\frac{q_i - q_{i-1}}{\Delta t} - \frac{q_{i-1} - q_{i-2}}{\Delta t}}{\Delta t} = \frac{q_i - 2q_{i-1} + q_{i-2}}{\Delta t^2}$$

Figure 13:
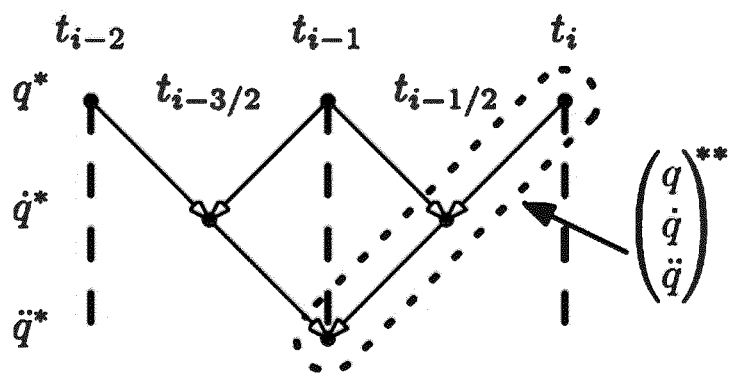
FIG. 13 illustrates the method of backward difference differentiation.

The problem of phase shift in backward difference differentiation is illustrated in FIG. 13, where $t_i$ denotes the current discrete time step, $t_{i-1}$ denotes the discrete time step occurring just before $t_i$, 2 denotes the discrete time step occurring two steps before $t_i$, $t_{i-1/2}$ denotes a virtual time step between $t_i$ and $t_{i-1}$, q* denotes the shaped position, q̇* denotes the first time derivative of q*, q̈ denotes the second time derivative of q*, and (q,q̇,q̈)** denotes the vector, which is passed on to the system. Here it is seen, that the velocity passed on is actually the velocity corresponding to time $t_{i-1/2}$ and the acceleration passed on is corresponding to time $t_{i-1}$. In other words, the velocity has a phase delay of $\Delta t/2$ and the acceleration has a phase delay of $\Delta t$. This is a major problem for a feedforward system because the feedforward position derivatives intents to aim toward the next target position. If the feedforward derivatives have phase shifts, the feedforward and feedback controls will have contradictory targets, resulting in generally higher position errors and higher levels of vibration arising.

An alternative to backward difference differentiation is central difference differentiation. Central difference differentiation has two major advantages over backward difference differentiation; central difference differentiation is second order accurate and has no phase shift. However, it comes with the challenge of being non-causal, i.e. has dependency on past, current and future inputs. The method of central difference differentiation is presented in eq. 6 and eq. 7, where $q_i$ is the current position, $\dot{q}_i$ is the current velocity, $\ddot{q}_i$ is the current acceleration, $D_{ctr}q_i$ is the central difference approximation of $\dot{q}_i$, $O(\Delta t^2)$ is the truncation error, and $\Delta t$ is the time step size. Note that the truncation error is of second order compared to the truncation error of first order for the backward difference differentiation.

$$\dot{q}_i = D_{ctr}q_i - O(\Delta t^2) \approx D_{ctr}q_i = \frac{q_{i+1} - q_{i-1}}{2\Delta t} \qquad \text{eq. 6}$$

$$\ddot{q}_i \approx \frac{D_{ctr}q_{i+1/2} - D_{ctl}q_{i-1/2}}{\Delta t} = \qquad \text{eq. 7}$$

$$\frac{\frac{q_{i+1} - q_i}{\Delta t} - \frac{q_i - q_{i-1}}{\Delta t}}{\Delta t} = \frac{q_{i+1} - 2q_i + q_{i-1}}{\Delta t^2}$$

Figure 14:
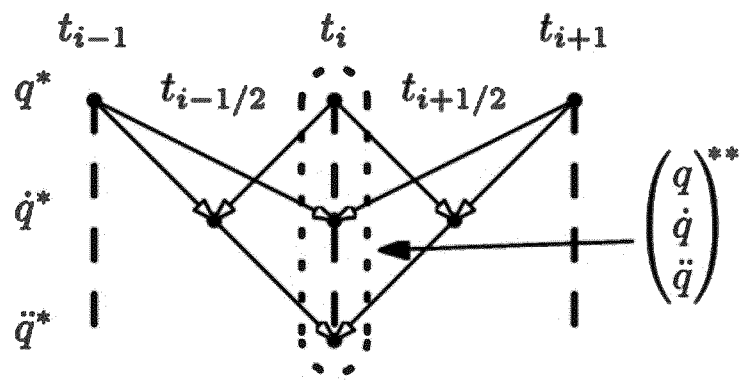
FIG. 14 illustrates the method of central difference differentiation.

The nature of central difference differentiation is illustrated in FIG. 14, where $t_i$ denotes the current discrete time step, $t_{i-1}$ denotes the discrete time step occurring just before $t_i$, $t_{i+1}$ denotes the discrete time step occurring just after $t_i$, $t_{i-1/2}$ denotes a virtual time step between $t_i$ and $t_{i-1}$, $t_{i+1/2}$ denotes a virtual time step between $t_i$ and $t_{i+1}$, q* denotes the shaped position, q̇* denotes the first time derivative of q*, q̈* denotes the second time derivative of q*, and (q,q̇,q̈)** denotes the vector, which is passed on to the system.

As indicated in eq. 6 and eq. 7 the non-causal behavior of central difference differentiation calls for knowledge about the position of the next time-step. This can be dealt with in different ways. One approach is to compute the next position together with the actual position in each time-step. The approach is illustrated in FIG. 14, where the position q* at time $t_{i+1}$ is predetermined. This approach has the advantage of no time delay and the disadvantage that if sudden changes in trajectory arise, the feedforward derivatives are inconsistent with the position of the next time-step. Also, the disadvantage of some additional computations.

Figure 15A:
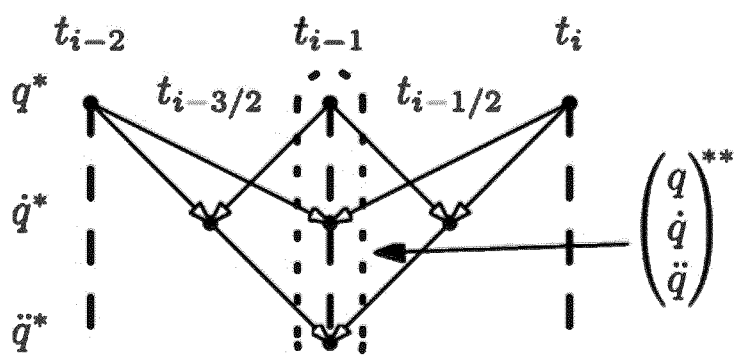
FIG. 15A and 15B illustrate the method of delayed central difference differentiation.

Another approach is to receive a new position, $q_i$ at time $t_i$, but pass on the previously received position, $q_{i-1}$ as illustrated in FIG. 15A. This way the extra computations are avoided, and the feedforward derivatives are second order accurate with respect to the position of past and future time-steps, even in the situation of sudden trajectory changes. The disadvantage is that the input will be delayed with one time-step compared to the approach above, hence reducing overall system responsiveness. Herein this method is referred to as delayed central difference differentiation.

The method of delayed central difference differentiation can for instance be used in a method of generating inputs to an actuator of a physical system, where the inputs comprises a position signal indicating the position of at least a part of the physical system and at least one position derivative signal indicating a derivative of the position of at least a part of the physical system.

Figure 15B:
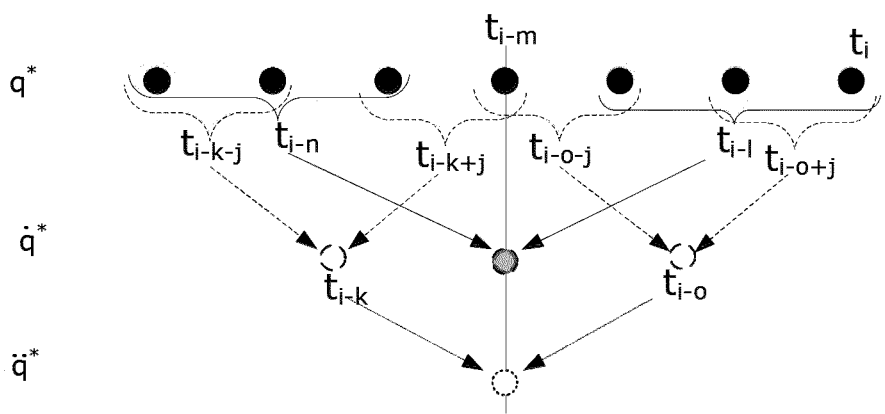

FIG. 15B illustrates the principles of the delayed central differentiation method where the at a time instant ti the position signal q* has been obtained and the input of the position signal is stored in a position input buffer comprising inputs of the position signal obtained at previous time instant. The inputs of the position input buffer is illustrated as black circles.

The method comprises a step of obtaining a first derivative signal $\dot{q}^*$ occurring at a time instant $t_{i-m}$ occurring at least one time-period before the instant time $t_i$ by numerical central difference differentiation based on:
  at least one input of the position input buffer obtained at a time instant $t_{i-n}$ before the time instant $t_{i-m}$. The inputs of the position input buffer are indicated by a solid bracket labeled $t_{i-n}$ and it is understood that one of more of the inputs before time instant $t_{i-m}$ can be used for the numerical central difference differentiation.
  at least one input of the position input buffer obtained at a time instant $t_{i-l}$ after the time instant $t_{i-m}$. The inputs of the position input buffer are indicated by a solid bracket labeled $t_{i-l}$ and it is understood that one of more of the inputs after time instant $t_{i-m}$ can be used for the numerical central difference differentiation.

The first derivative signal $\dot{q}^*$ occurring at a time instant $t_{i-m}$ is illustrated by a gray shade dashed circle.

The method comprises a step of obtaining a second derivative signal $\ddot{q}^*$ occurring at a time instant $t_{i-m}$ occurring at least one time-period before the instant time $t_i$ by numerical central difference differentiation based at least three of the inputs of the position input buffer. In this example second derivative signal $\ddot{q}^*$ at time instant $t_{i-m}$ (illustrated by dotted circle) is obtained based by numerical central difference differentiation based on a first derivative signal occurring at a time instant $t_{i-o}$ (illustrated by dashed circle) and a first derivative signal occurring at time instant $t_{i-k}$ (illustrated by dashed circle), as illustrated by dotted arrows.

The first derivative signal at a time instant $t_{i-o}$ occurring at least a half time-period after the time instant $t_{i-m}$ is obtained by numerical central difference differentiation based on:
  at least one input of the position input buffer obtained at a time instant $t_{i-o+j}$ occurring after the time instant $t_{i-o}$; The inputs of the position input buffer is indicated by a dashed bracket labeled $t_{i-o+j}$ and it is understood that one of more of the inputs after time instant $t_{i-o}$ can be used for the numerical central difference differentiation; and
  at least one input of the position input buffer obtained at a time instant $t_{i-o-j}$ occurring before the time instant $t_{i-o}$. The inputs of the position input buffer is indicated by a dashed bracket labeled $t_{i-o-j}$ and it is understood that one of more of the inputs before time instant $t_{i-o}$ can be used for the numerical central difference differentiation.

The first derivative signal at a time instant $t_{i-k}$ occurring at least a half time-period before the instant time $t_{i-m}$ is obtained by numerical central difference differentiation based on:
  at least one input of the position input buffer obtained at a time instant $t_{i-k+j}$ occurring after the time instant $t_{i-k}$; The inputs of the position input buffer is indicated by a dashed bracket labeled $t_{i-k+j}$ and it is understood that one of more of the position inputs after time instant $t_{i-k}$ can be used for the numerical central difference differentiation; and
  at least one input of the position input buffer occurring at a time instant $t_{i-k-j}$ obtained before the time instant $t_{i-k}$; The inputs of the position input buffer is indicated by a dashed bracket labeled $t_{i-k-j}$ and it is understood that one of more of the inputs before time instant $t_{i-k}$ can be used for the numerical central difference differentiation.

The inputs to the actuator of the physical system are provided as the position signal obtained at the time instant $t_{i-m}$, the obtained first derivative signal occurring at the time instant and the obtained second derivative signal occurring at the instant $t_{i-m}$. Consequently, it is ensured that the position signal and it's derivatives that are provided to the physical system relates to the same time instant and thus are not shifted in time in relation to each other. Thereby a more robust control of the physical system can be provided.

FIG. 15A illustrates an embodiment where the first derivative signal occurring at the time instant $t_{i-m}$ is obtained at at a time instant $t_{i-1}$ occurring one time-period before the instant time $t_i$ by numerical central difference differentiation based on the input of the position input buffer obtained at the time instant $t_i$ and the input of the input buffer obtained at the time instant $t_{i-2}$ occurring two time-periods before the instant time $t_i$. The first derivative signal occurring at time instant $t_{i-o}$ is obtained at time instant $t_{i-1/2}$ occuring a half time-period before the instant time $t_i$ by numerical central difference differentiation based on the input of the input buffer at the time instant $t_i$ and the input of the input buffer at the time instant $t_{i-1}$ occurring one time-period before the instant time $t_i$. The first derivative signal occurring at a time instant $t_{i-k}$ is obtained at a time instant $t_{i-3/2}$ occurring three half time-periods before the instant time $t_i$ by numerical central difference differentiation based on the input of the input buffer at the time instant $t_{1-2}$ occurring two time-periods before the instant time $t_i$ and the input of the input buffer at the time instant occurring one time-period before the instant time $t_i$; and the obtained second derivative signal at time instant $t_{i-m}$ is obtained at instant $t_{i-1}$ occurring one time-period before the instant time $t_i$ by numerical central difference differentiation based on the obtained first derivative signal at the time instant $t_{i-1/2}$ occurring a half time-period before the instant time $t_i$, and the first derivative signal at a time instant $t_{i-3/2}$ occurring three half time-periods before the instant time $t_i$; and in that the inputs to the actuator of the physical system are further provided as the obtained second derivative signal at the time instant $t_{i-1}$ occurring one time-period before the instant time $t_i$.

Figure 36:
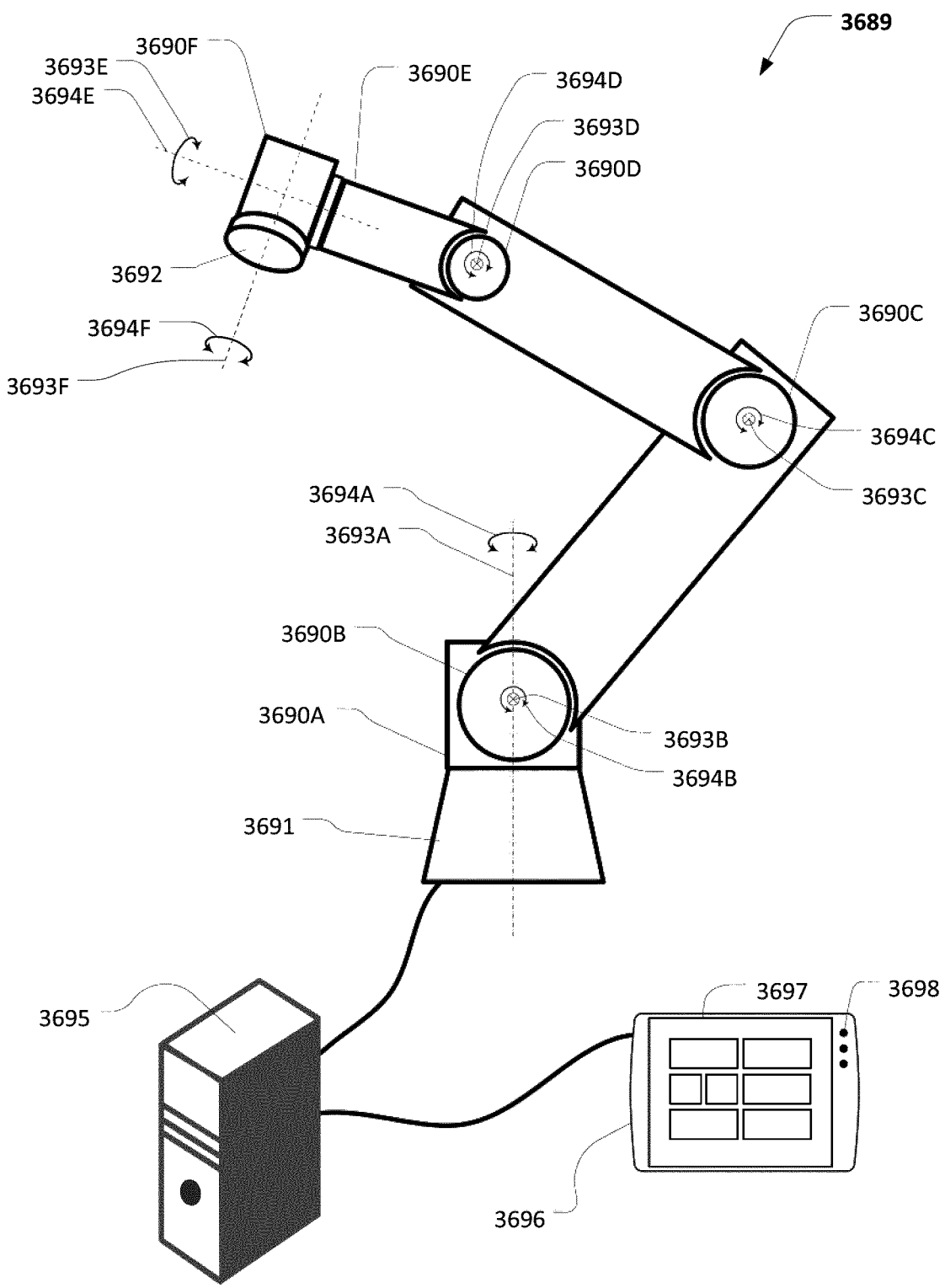
FIG. 36 illustrates a robot arm configured according to the present invention.

The method of delayed central difference differentiation can for instance be used in a robot comprising a plurality of robot joints, where the robot joints comprises a joint motor, the robot comprises a robot controller configured to control the joint motor based on inputs comprising a position signal indicating the position of at least a part of the robot and at least one position derivative signal indicating a derivative of the position of at least a part of the robot, where the robot controller is configured to generate the potion inputs and the position derivative inputs by implementing the described delayed central difference differentiation as described in paragraphs [0043]-[0051] and the robot can for instance be like the robot shown in FIG. 36 and described in paragraphs [0121]-[0130].

Discrete Time Implementation

Figure 16:
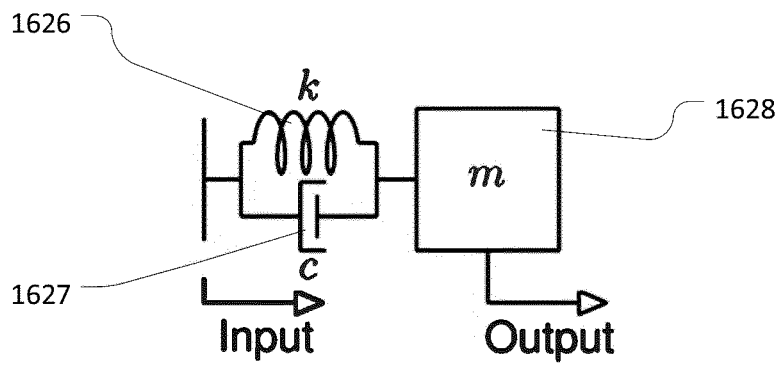
FIG. 16 illustrates a simple spring, mass, damper system.
Figure 17:
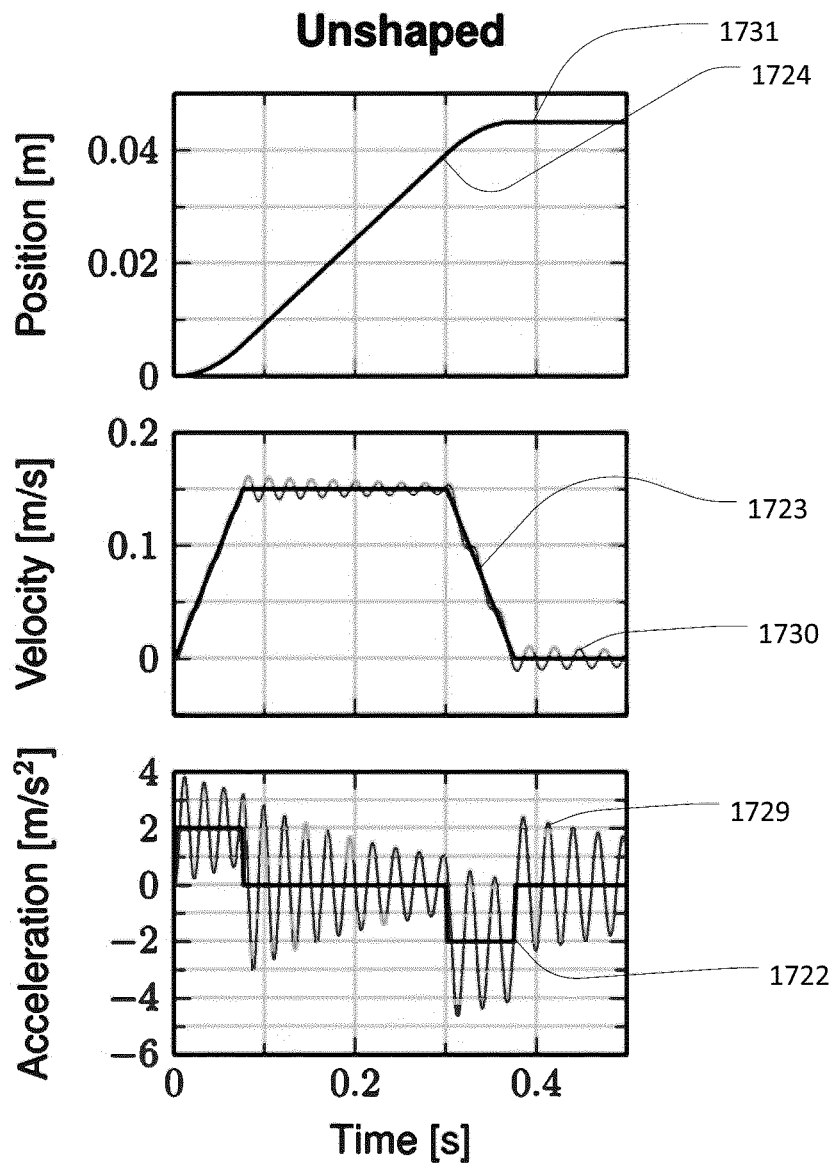
FIG. 17 illustrates the behavior of a spring, mass, damper system with position dependent dynamics when exposed to an unshaped bang-coast-bang acceleration profile.

By combining the described discrete time buffer implementation with or without impulse splitting and any numerical differentiation scheme, some interesting findings are revealed. For illustration, a case study is performed on a simple spring-mass-damper system comprising a spring 1626, a damper 1627 and a mass 1628 as illustrated in FIG. 16, where k denotes the spring stiffness, m denotes the system mass, and c denotes system damping. The mass is to be moved from one position to another by giving a position input, while position output is the parameter of interest. To introduce configuration dependent dynamics to the system, the system mass is made configuration dependent. The unshaped input position follows a traditional bang-coast-bang acceleration profile. The dynamic behavior of the system to the unshaped command is illustrated in FIG. 17, where the black lines are the system input and illustrate input acceleration 1722, input velocity 1723 and input position 1724. The grey lines are system output and illustrate output acceleration 1729, output velocity 1730 and output position 1731. It is noted that the output position 1731 and input position 1724 appears to be coincident however the skilled person will realize from the output velocity 1730 and output acceleration 1729, that output position 1731 has oscillations, albeit too small in amplitude to be visible in FIG. 17.

Figure 18:
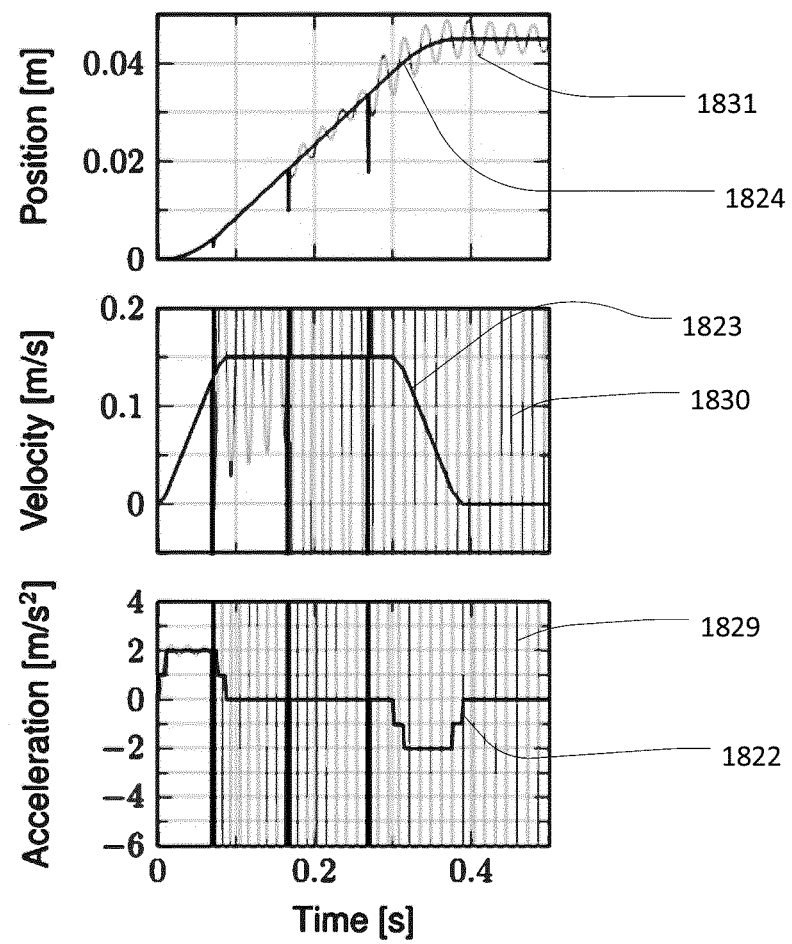
FIG. 18 illustrates the behavior of a spring, mass, damper system with position dependent dynamics when exposed to a time-varying ZV shaped position for a bang-coast-bang acceleration profile with future outputs buffer and without impulse splitting.

A time-varying zero vibration input shaping position filter with the described buffer of future outputs is introduced, and its behavior is illustrated in FIG. 18, where the black lines are the system input and illustrate shaped input acceleration 1822, shaped input velocity 1823 and shaped input position 1824. The grey lines are system output and illustrate output acceleration 1829, output velocity 1830 and output position 1831. In the figure it is seen, that when the period of vibration changes by a certain amount, the delayed impulse jumps to another discrete time step and position spikes will occur for this implementation without impulse splitting, introducing severe amounts of vibrations in the system.

Figure 19:
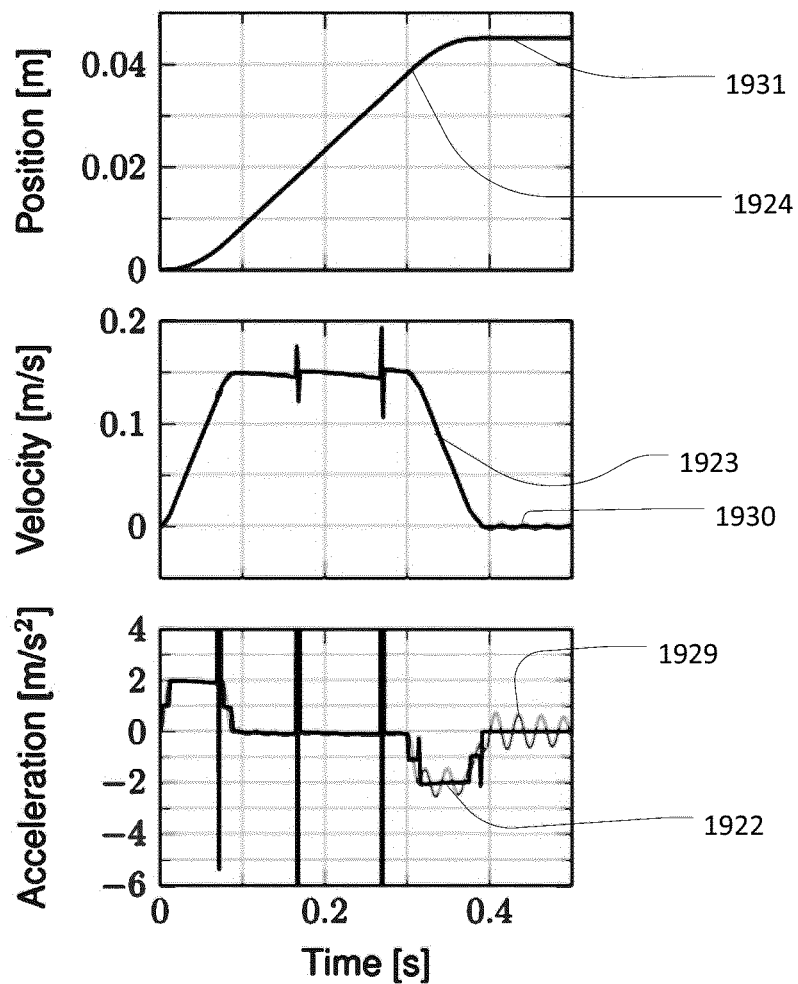
FIG. 19 illustrates the behavior of a spring, mass, damper system with position dependent dynamics when exposed to a time-varying ZV shaped position for a bang-coast-bang acceleration profile with future outputs buffer and impulse splitting.

A time-varying zero vibration input shaping position filter with the described buffer method and Murphys impulse splitting is introduced and its behavior is illustrated in FIG. 19, where the black lines are the system input and illustrate shaped input acceleration 1922, shaped input velocity 1923 and shaped input position 1924. The grey lines are system output and illustrate output acceleration 1929, output velocity 1930 and output position 1931. With the introduction of impulse splitting, the spikes are reduced and the method is shown to be an effective vibration suppression method. However, small jumps still occur in shaped input position 1924. These are readily overseen, but with the introduction of numerical differentiation, spikes in derivatives are a clear proof that this method is far from perfect. Vibrations are still introduced to the system, albeit significantly reduced with the implementation of impulse splitting.

Figure 20:
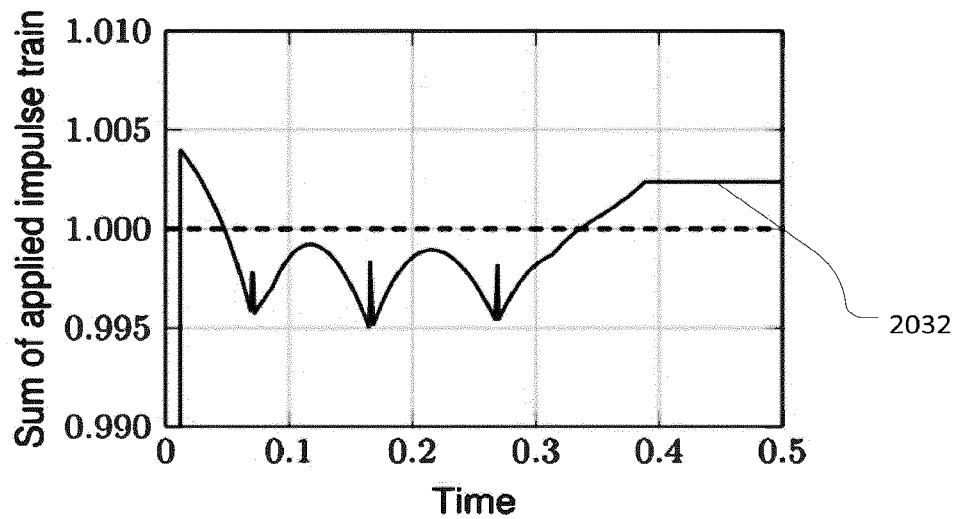
FIG. 20 illustrates the sum of applied impulse train when applying impulse splitting.

Another problem for filter output buffering with or without impulse splitting is that the sum of applied impulses differs from unity. This will lead to deviations from the desired input to the system after convolution. An example of this behavior is presented in FIG. 20, which shows the sum of applied impulses 2032 over time for the example with impulse splitting in FIG. 19. The plot reveals the varying behavior of the sum of impulses, including spikes when jumps occur in the discrete time steps.

To address the challenges of discrete time implementation of time varying input shaping, a new approach is used to implement the present invention. Whereas traditionally a buffer of the future filter outputs has been used, a buffer of the past filter inputs is instead used in accordance with the present invention. The main motivation for this new implementation is to improve vibration suppression by 1) achieving filter outputs without jumps or spikes, 2) obtaining more precise eigenfrequency and damping ratio estimates, 3) obtaining more precise motions due to constant unity sum of applied impulse train yielding zero steady state error in filter output. Other benefits for the new implementation over the traditional implementation include reduced computational costs.

The principle of our implementation is very unlike the traditional buffer implementation. The common approach is to receive an input, add part of it to the output of the actual time step and add the rest to the outputs of one or more future time steps. Essentially with the idea to pass on something now and queue some for later, i.e. with the perspective of looking forward in time.

Our method has perspective of looking backwards in time. It is based on the idea to receive an input, use part of it and for look back in time for the rest of the output. This ensures that the sum of applied impulses is unity at all times even when the dynamic properties of the physical system changes, hereby it is ensured that the final position of the shaped input signal is the same as the unshaped input signal and the vibrations of the physical system is also reduced.

Figure 21:
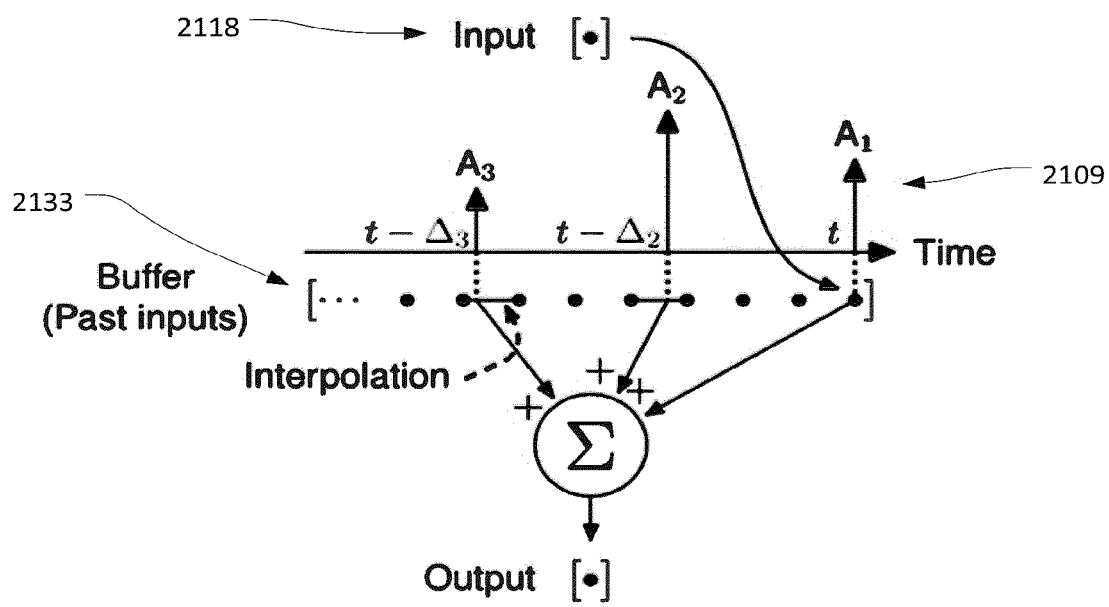
FIG. 21 illustrates the principle of real time convolution with a buffer of past filter inputs and buffer interpolation.

By buffering the past filter inputs instead of filter outputs, the computationally heavy problem of impulse splitting can be disregarded in exchange for a simple interpolation problem. In digital audio processing this type of filter is referred to as a Fractional Delay Finite Impulse Response (FD FIR) filter [41]. FIG. 21 is an example of implementation for a three-impulse shaper with the buffer approach of the present invention.

The example of FIG. 21 illustrates how a filter receives a filter input in form of a discrete unshaped input signal 2118 of the current time step, t, which is added to a buffer 2133. The delays of the impulses 2109 in the sequence, $\vec{\Delta}$, is with respect to the current time step, t. Since the delays have positive values, the position of the delays on the time line is denoted with a negative sign. For the common methods of determining vibration free impulse sequences, the delay of the first impulse, $\Delta_1$, is equal to zero, as is also the case for this example, hence $t-\Delta_1=t$. Otherwise, a delay without any other effects will be introduced. Therefore, the filter input of the current time step, t, can be multiplied directly by the magnitude of the first impulse, $A_1$, and added to the output of the current time step, t, by convolution. The output of the filter forms a discrete shaped input signal 2120. However, $t-\Delta_2$ and $t-\Delta_3$ do not coincide with the time of any previous discrete time filter inputs. Therefore, the impulse magnitudes $A_2$ and $A_3$ are multiplied with an estimated filter input at t−$\Delta_2$ and t−$\Delta_3$ and added to the filter output at the current time step, t, by convolution. Hence this filter is a method of implementing the convolution of filter inputs and impulse sequence as described by eq. 3. The estimation of filter inputs at the time of t−$\Delta_2$ and t−$\Delta_3$ is performed by using a description of the relation between the discrete time filter inputs. This description of relation could consist of linear interpolation between the adjacent discrete time filter inputs, i.e. Lagrange interpolation of 1st order. The impulse sequence at the current time step, t, is established based on a quantification of the system dynamic parameters at the time t, or an estimation thereof.

As seen from the example of FIG. 21, it is important that the buffer has a length, which ensures that the descriptor has enough information for approximating the input signal at time t−$\Delta_n$, where n is the last impulse of the sequence. For instance if the physical system is a collaborative robot as knowing in the art, the lowest damped frequency $f_d$ is around 4 Hz results in a system where the last impulse need to be applied after approximately $\Delta_n = f_d/1 = 0.25$s, if the impulse generation scheme is of type ZVD. If the robot controller has a sample rate of $f_s$ of 500 Hz, then the buffer must be capable of storing at least $f_s \cdot \Delta_n = 125$ input samples. This number could be a little higher depending on the choice of interpolator.

The implementation of the present invention has the very big advantage over the common implementation, that the impulse scaling, $\vec{A}$, and impulse timing, $\vec{\Delta}$, can be established and applied at the time of filter output instead of time of filter input. This in itself yields more precise estimates of system dynamics, as the filter output will be closer to the actual physical state of the controlled system.

Figure 22:
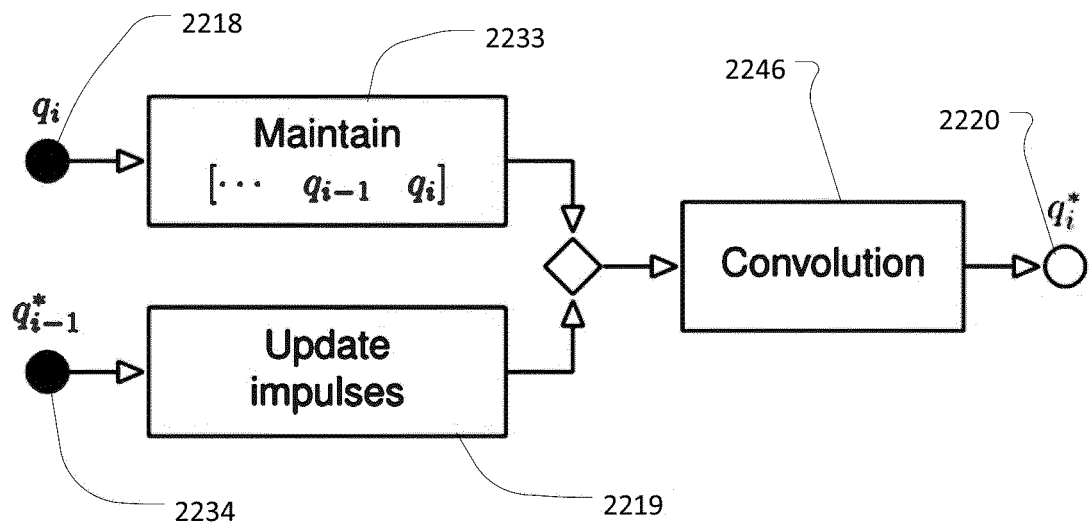
FIG. 22 illustrates the principle of updating input buffer and impulse train before convolution.

Moreover, the nature of the present implementation avoids the jumps in the output, opening the opportunity to establish the impulses based on the output. For example, it is possible to establish the impulses based on the last shaped output, assuming small changes in dynamics for each time step as illustrated in FIG. 22. FIG. 22 illustrates a diagram of a system or method where inputs from an input signal 2218 are stored in an input buffer 2233 and where an impulse train 2219 is updated based on a previously shaped input signal 2234 (output) and where the input buffer is convolved 2246 with the updated impulse train in order to obtain the shaped input signal (output), where a previous input signal have been used to obtain the dynamic properties of the physical system based on which the impulse train have been generated. This will once again increase accuracy of estimated system dynamics because we estimate the dynamics of the current configuration of the system.

Figure 23:
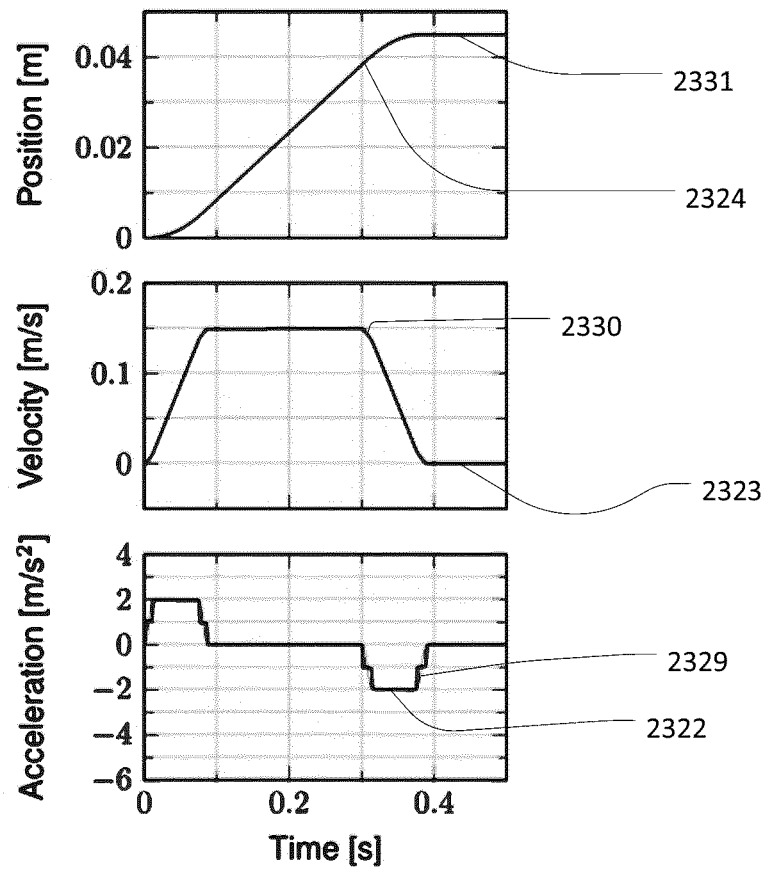
FIG. 23 illustrates the behavior of a spring, mass, damper system with position dependent dynamics when exposed to a time-varying ZV shaped position for a bang-coast-bang acceleration profile with interpolated past inputs buffer.
Figure 24:
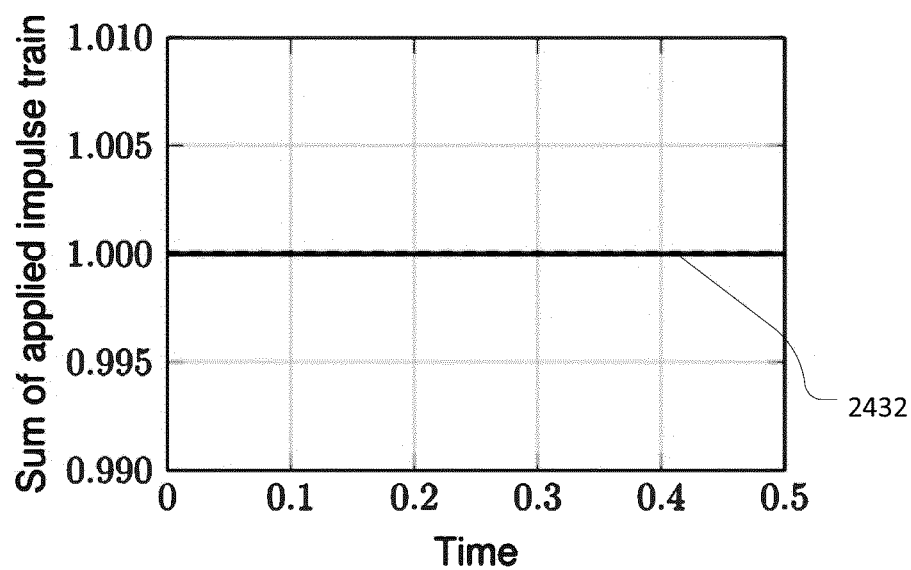
FIG. 24 illustrates the sum of applied impulse train when applying a buffer of past filter inputs and buffer interpolation.

An illustration of the effectiveness of the present invention is presented in FIG. 23, where the black lines are the system input and illustrate shaped input acceleration 2322, shaped input velocity 2323 and shaped input position 2324. The grey lines are system output and illustrate output acceleration 2329, output velocity 2330 and output position 2331. Here it is seen, that even with the implementation of numerical differentiation, the derivatives have no jumps or spikes like it was the case for the filter output buffering implementation in FIG. 18 and FIG. 19. The sum of applied impulse train 2432 is illustrated in FIG. 24, which clearly shows that the sum of applied impulse train is constant unity in contrast to the varying sum of applied impulse train for the impulse splitting in FIG. 20. It is also noticed that the input velocity 2323 is constant during the coast phase of the motion. The duration of the motion is exactly the same as for the filter output buffer, hence the present invention is deemed superior to prior art.

Notes

Even more precise estimates could be achieved by using sensors to determine the actual configuration of the system instead of using shaped position. This would base the dynamics estimation on actual configuration instead of target configuration.

The vibration control strategy of the present invention works with any vibration free impulse train generation scheme. Impulse trains described in closed form are preferable in real time applications to reduce the amount of computations in each time step.

Figure 25:
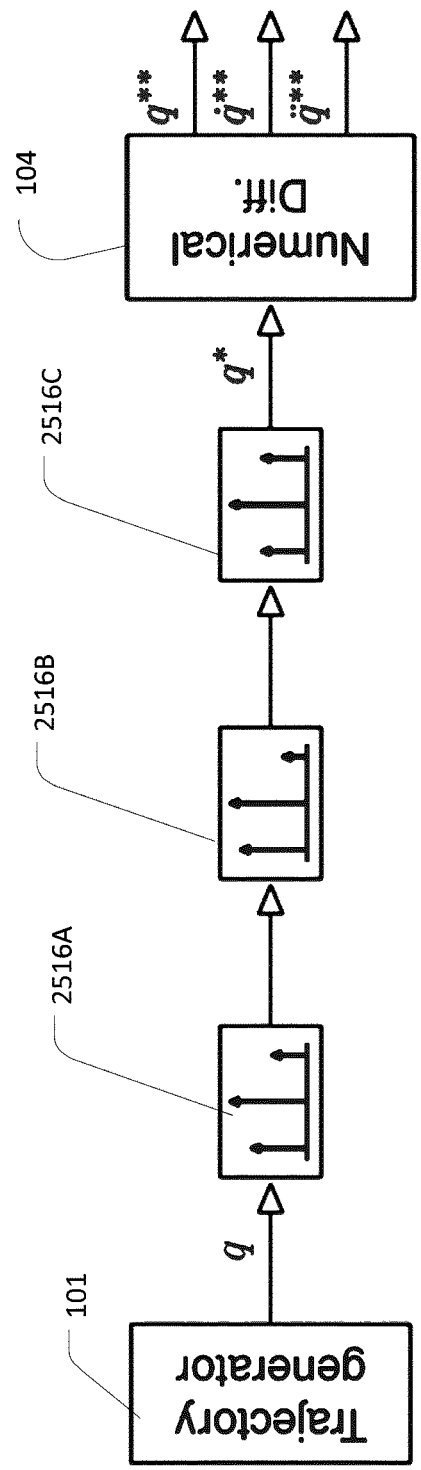
FIG. 25 illustrates the principle of shaping an input with multiple shaping filters and differentiating to obtain derivatives.
Figure 26:
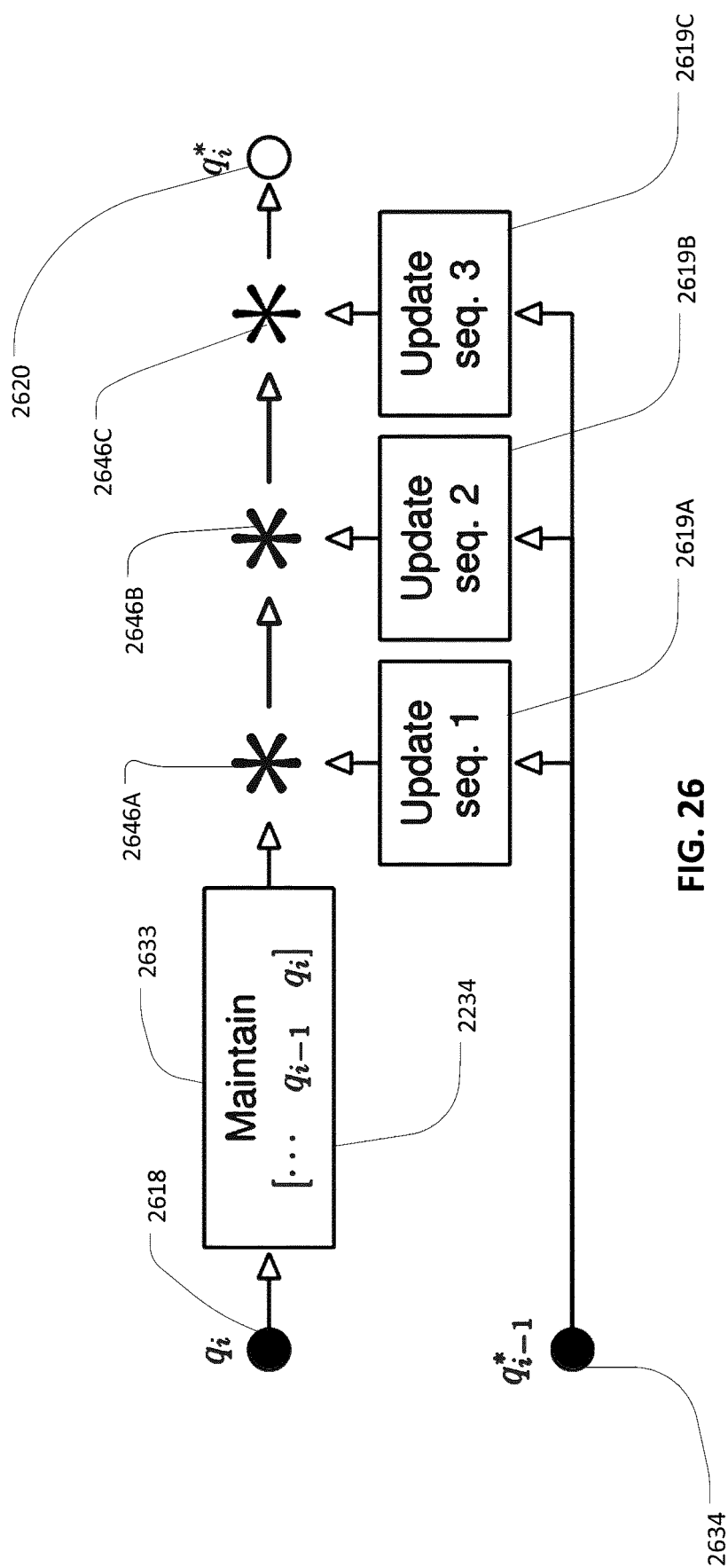
FIG. 26 illustrates the principle of updating input buffer and impulse train before convolution when more than one impulse train is applied in series.

Multiple filters 2516A, 2516B, 2516C can be added in series as illustrated in FIG. 25, for example to eliminate multiple vibration modes and/or increase robustness to modeling error. For implementing multiple filters in series, it is possible to update the individual impulse sequences based on the output of the last filter as illustrated in FIG. 26. FIG. 26 illustrates a diagram of a system or method where inputs from an input signal 2618 are stored in an input buffer 2633, where the input buffer successively is convolved 2646A, 2646B 2646C respectively with impulse trains 2619A, 2619B and 2619C resulting in the shaped input signal (output) 2620. The impulse trains 2619A, 2619B and 2619C is updated based on a previously shaped input signal 2634 (output).

For a system with more than one degree of freedom, it is possible to use separate impulse trains for the individual joints, or identical impulse trains can be used for all joints. Separate impulse trains will potentially provide multi-mode vibration suppression with low time delay, whereas identical impulse trains will provide better consistency between actuator positions. A combination could be implemented with identical impulse trains for suppressing low frequency vibration modes, and separate impulse trains for higher frequency vibrations.

In the presented examples, the shaping filter has been positioned outside the closed loop control. The filter could also be placed inside the feedback loop.

For system dynamics estimation, it is possible to use models, tables, measurements or a combination of aforementioned. For many systems, the flexibility of actuator and gearing are dominant for the overall system, and the rest of the mechanical structure can be estimated as rigid bodies. However, the development of light weight structures requires inclusion of structural flexibility, e.g. in collaborative robots, where it could be necessary to model both link and joint flexibility.

Examples of different modeling approaches to dynamics estimation, that could be used with the vibration suppression method of the present invention are; finite element methods [42, 43], symbolic Lagrangian methods [44], lumped parameter methods [45], transfer matrix methods [46, 47], and assumed mode methods [48].

Numerical Results

Figure 27:
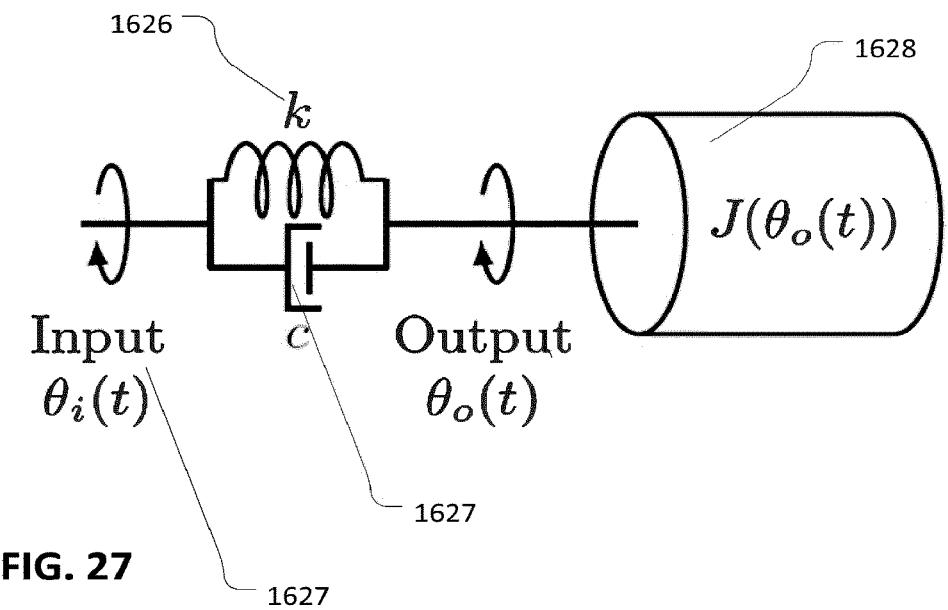
FIG. 27 illustrates a simple rotational system where an inertia is rotated.

A set of numerical simulations have been performed in order to test and compare the method according to the present invention with time-varying input shaping methods according to prior art. The dynamic system used in the numerical simulations is illustrated in FIG. 27 and is a system similar to the spring-mass-damper system of FIG. 16 comprising a spring 1626, a damper 1627 and a mass 1628, where k denotes the spring stiffness, m denotes the system mass, and c denotes system damping. In these simulations the system is rotational and a rotational input 2761 defining an input angle $\theta_i$, results in a rotational output 2762 defining an output angle, $\theta_o$. The inertia, $J(\theta_o(t))$ of the mass is set to vary linearly with the output angle, $\theta_o$, when it changes its orientation from $\theta^a$ to $\theta^b$. Thus, this system imitates the time-varying inertia of a robot arm with one degree of freedom (1DOF). Throughout the simulations the input signal is provided as the very common bang-coast-bang trajectory, also known as Linear Segments with Parabolic Blends (LSPB) [49].

In order to demonstrate the effectiveness of the proposed method in the following called input buffer method (IBM) in relation to the prior art input shaping methods in the following called output buffer method (OBM), different studies have been performed:

1) A case study demonstrating the performance of IBM and OBM methods for a chosen set of system parameters;

2) A parametric sweep, where the performance of IBM shaping is compared to OBM shaping over a range of different system parameters; and 3) A demonstration position difference between input signal and shaped output signal for the OBM and IBM methods.

All simulations have been performed using the simple ZV shaper impulse scheme (described in paragraph [0013]). The ZV shaper have been chosen for two reasons in this study: 1) Under perfect conditions, the impulse generation scheme should result in zero vibration; and 2) The ZV shaper is proven sensitive to modeling error, making it suitable for benchmarking convolution methods against each other.

The chosen case study parameters are based on observations from a common collaborative robot from Universal Robots A/S, where the lowest natural frequencies and largest vibration amplitudes are experienced for maximum payload and maximum base to payload horizontal distance. In these situations, the first natural frequency is found to be in the order of 4 Hz with a damping ratio around 0.14.

The controller sample rate of the study was chosen to be 500 Hz, which is within the normal span for industrial robots, e.g. Universal Robots with 500 Hz and KUKA Lightweight Robot with 1 kHz. The system parameters and kinematic limits of the trajectory are listed in Table 1

TABLE 1

Case study system parameters

|  |  | Value | Unit |
|---|---|---|---|
| Parameters |  |  |  |
| Inertia | J | 3.10 + 1.39 $\theta_o(t)$ | kgm$^2$ |
| Spring stiffness | k | 2000 | Nm |
| Damping coef. | c | 22.1 | Nms |
| Position a | $\theta^a$ | 0 | rad |
| Position b | $\theta^b$ | 0.5 | rad |
| Max velocity |  | 0.375 | s$^{-1}$ |
| Max acceleration |  | 1 | s$^{-2}$ |
| Sample rate |  | 500 | Hz |
| Derived parameters |  |  |  |
| Inertia a | J$^a$ | 3.10 | kgm$^2$ |
| Inertia b | J$^b$ | 3.80 | kgm$^2$ |
| Damped freq. a | $f_d^a$ | 4.00 | Hz |
| Damped freq. b | $f_d^b$ | 3.62 | Hz |
| frequency ratio | $f_d^b/f_d^a$ | 0.91 | — |
| Damping ratio a | $\zeta^a$ | 0.140 | — |
| Damping ratio b | $\zeta^b$ | 0.127 | — |

Figure 28:
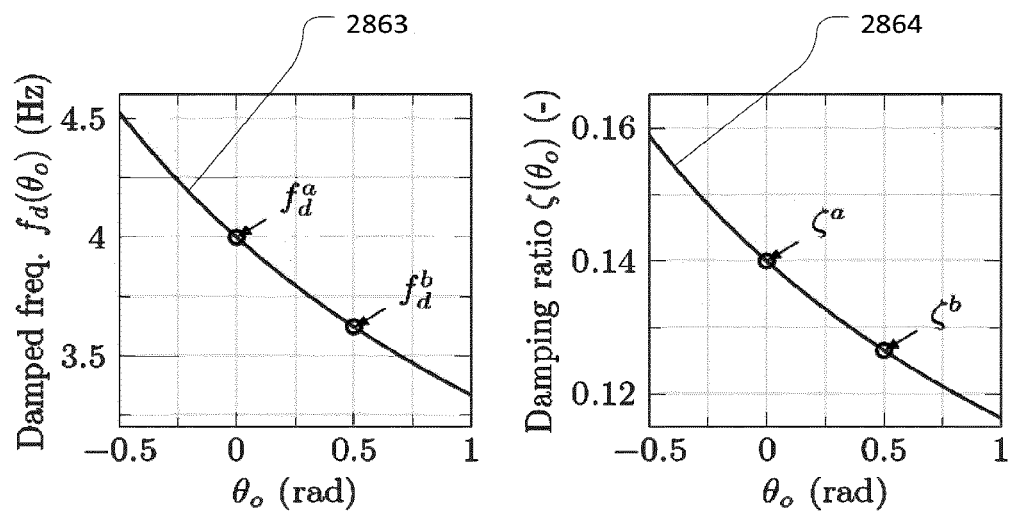
FIG. 28 illustrates varying dynamic properties of the simple rotational system of FIG. 27.

FIG. 28 illustrates graphs of the time-varying nature of the systems damped frequency, $f_d(\theta_o)$ 2863, and damping ratio, $\zeta_d(\theta_o)$ 2864. Here it is seen how both $f_d(\theta_o)$ and $\zeta_d(\theta_o)$ are decreasing for increasing $\theta_o$. This is due to the increasing mass moment of inertia $J(\theta_o)$ for increasing $\theta_o$.

Figure 29:
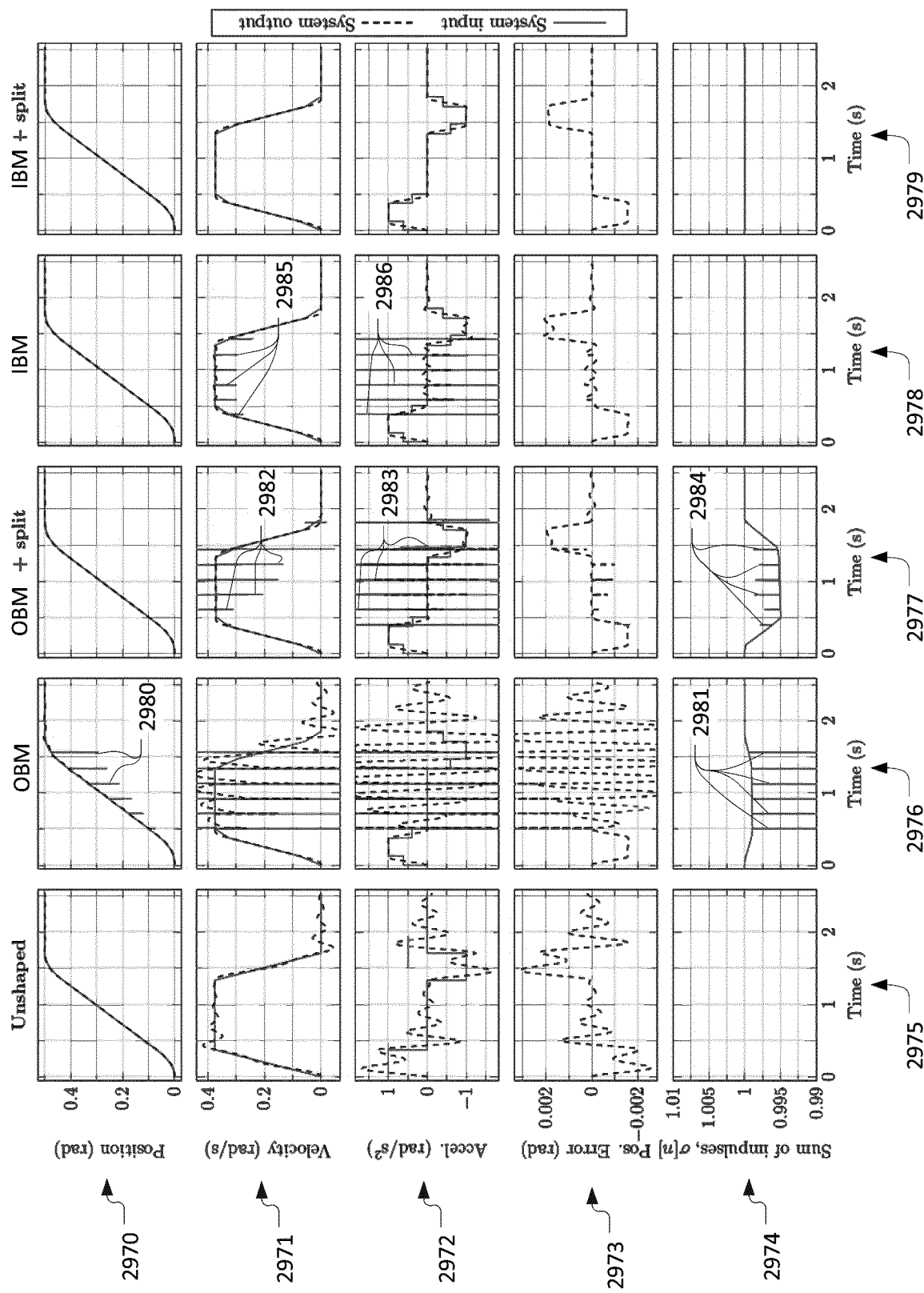
FIG. 29 illustrates the various inputs and outputs of the simple rotational system of FIG. 27 obtained by different methods.

The case study results are illustrated in FIG. 29 where:
the charts in row 2970 illustrate the input position (solid gray line) and output position (dashed black line);
the charts in row 2971 illustrate input velocity (solid gray line) and output velocity (dashed black line);
the charts in row 2972 illustrate input acceleration (solid gray line) and output acceleration (dashed black line);
the charts in row 2973 illustrate position error (dashed black line);
the charts in row 2974 illustrates sum of impulses (solid gray line); and where;
the charts in column 2975 relate to an unshaped input signal
the charts in column 2976 relate to an input signal shaped using OBM without impulse splitting;
the charts in column 2977 relate to an input signal shaped using OBM with impulse splitting;
the charts in column 2978 relate to an input signal shaped using IBM without impulse splitting;
the charts in column 2979 relate to an input signal shaped using IBM with impulse splitting;

The position peaks 2980 for the OBM is clearly identified. It is seen how the OBM leads to an increased amount of vibrations, when looking at for example the position error compared to the position error in the unshaped situation. To study the origin of these peaks, the sum of impulses, $\sigma[n]$, is plotted. By comparing the system inputs to the sum of impulses, it is clearly seen that the peaks present 2981 in $\sigma[n]$ occurs at the same time as the peaks 2980 in input position.

It is also readily noticed, how these peaks in input position seems to disappear once impulse splitting is included in the OBM, and that this method proves to be an effective vibration suppression method by comparing the position error to the position error in the unshaped situation. As listed in Table 2 the OBM with impulse splitting reduces the amount of residual vibration to 10.3% compared to the original motion. However, numerical differentiation of the input position reveals, that small imperfections are still present in the position signal. This is seen from the peaks in input velocity 2982 and the peaks in acceleration 2983.

TABLE 2

Case Study Results

| Method | Position residual vibration (rad) | Normalized |
|---|---|---|
| Unshaped | 2.33E-03 | 100.0% |
| OBM | 4.05E-03 | 173.9% |
| OBM + split | 0.24E-03 | 10.3% |
| IBM | 0.11E-03 | 4.6% |
| IBM + split | 8.69E-06 | 0.4% |

It is found, that the peaks in input velocity 2982 and acceleration 2983 are present whenever peaks 2984 are present in the sum of impulses. However, it is also noticed that the sum of impulses has a trapezoid like shape, and that peaks in acceleration are present at the time of the corners of this trapezoidal profile.

When implementing the IBM, no visible position peaks are seen, even without any impulse splitting. Peaks 2985 are still found in the input velocity of OBM and peaks 2986 are found in the input acceleration of OBM, but it should be noticed how they are surprisingly significant smaller than for the OBM without impulse splitting and the OBM with impulse splitting. The behavior is different, and this is seen both in the velocity peaks and in the position error plot. As seen, the sum of impulses has constant unity value, meaning this does not cause the peaks.

It might also be noticed that the peaks in velocity for IBM is unidirectional in contrast to the bidirectional peaks in velocity for OBM with impulse splitting. These differences arise because the IBM position signal will contain small steps whenever an impulse switch from one discrete time step to another, rather than the small peaks found in the position signal of the OBM with impulse splitting. This is also the reason for the saw tooth shape of the position error.

Once implementing linear extrapolation impulse splitting together with the IBM (i.e. $1_{st}$ order Lagrangian interpolation FD-FIR), it is clearly seen, that it is possible to eliminate all peaks in the system input position and its derivatives. Besides avoiding peaks, it is also clear that the amount of vibration is reduced by switching from OBM to IBM. As it reads from Table 2, the IBM with impulse splitting is able to reduce the amount of residual vibration to 0.4% compared the to the original motion, which is less than a tenth compared to the OBM with impulse splitting.

In order to investigate whether the chosen case study is just a set of optimal conditions for the IBM, a parametric sweep will be presented in the following paragraphs [0086]-[0095].

The sweep parameters of the parametric sweep have been chosen to be the initial damped frequency, $f_d^a$, together with the ratio between initial and final damped frequency, $f_d^b/f_d^a$. In practice the variation in these parameters are obtained by adjusting the coefficients in the inertia, $J(\theta_o(t))$, and the damping coefficient, c. The damping coefficient is adjusted in order to maintain a constant initial damping ratio, $\zeta^a=0.14$, through all points in the sweep. This ensures a comparable residual vibration throughout the sweep. For the same reason it has been chosen to compare the acceleration amplitude of the residual vibration, rather than position error amplitude, which decreases with higher frequencies. Varying $f_d^a$ and $f_d^b/f_d^a$ results in a surface plot, which may be presented as in FIG. 30 and FIG. 31.

Figure 30:
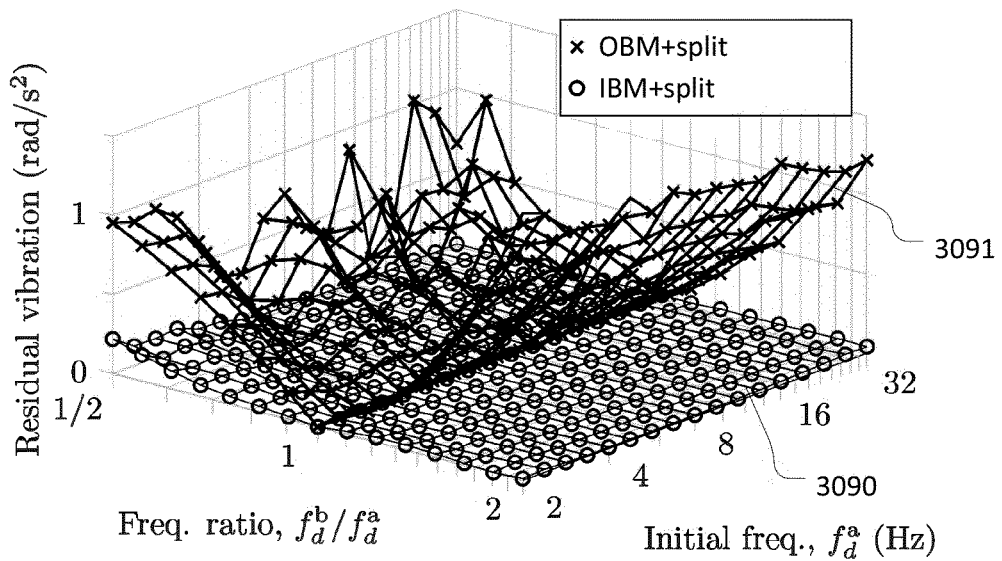
FIG. 30 illustrates the residual vibration acceleration amplitude for parameter sweep of initial damped system frequency, and frequency ratio, for IBM with impulse splitting and OBM with impulse splitting at an angled position.
Figure 31:
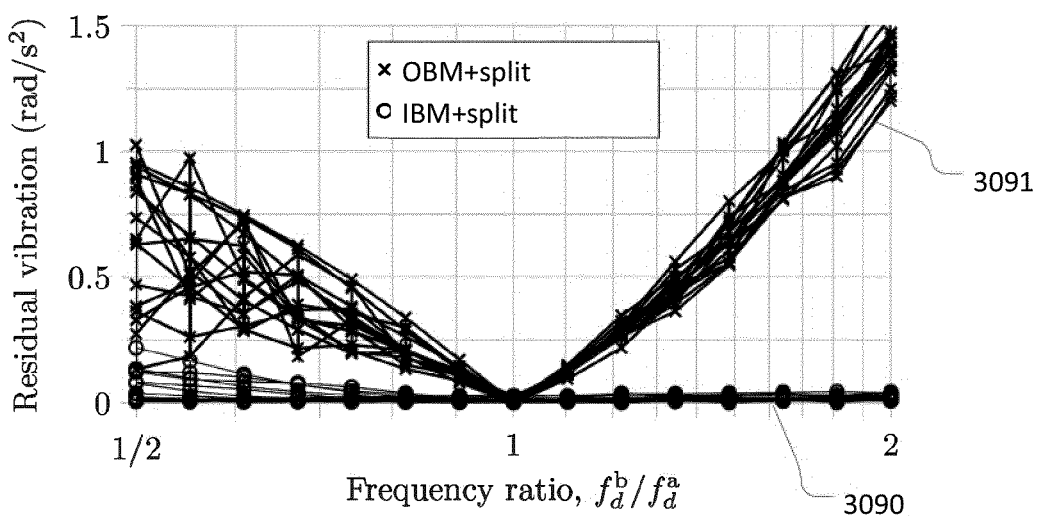
FIG. 31 illustrates the residual vibration acceleration amplitude for parameter sweep of initial damped system frequency, and frequency ratio, for IBM with impulse splitting and OBM with impulse splitting at a straight view.

FIG. 30 and FIG. 31 are grid plots illustrating the residual vibration of the IBM with impulse splitting 3090 and the residual vibration of the OBM with impulse splitting 3091, where the points of the IBM are illustrated with a circle and the points of the OBM are illustrated with a cross. FIG. 30. is a perspective view of the grid plot and FIG. 31 is a plane view of the grid plot.

Quite a few interesting observations can be made from the sweep plots. First, it should be noted how both methods lead to near ideal vibration suppression where $f_d^b/f_d^a=1$, i.e. when the system dynamics are time-invariant.

Secondly, it is noted that the residual vibration of the OBM increases rapidly, when $f_d^b/f_d^a$ shifts away from 1, where the IBM response is very at in nature, resulting in efficient vibration suppression even for rapidly changing dynamics.

Thirdly, it looks like the OBM response is increasingly stochastic for increasing initial frequency. However, this is not the case. The reason for this seemingly stochastic behavior is, that for increasing frequencies, there will be an increased number of peaks in the sum of impulses during motion, and whenever a peak appears just before the final position, this will impact the residual vibration noticeably. This behavior is not seen for the IBM since, there are no peaks in the sum of impulses.

Figure 32:
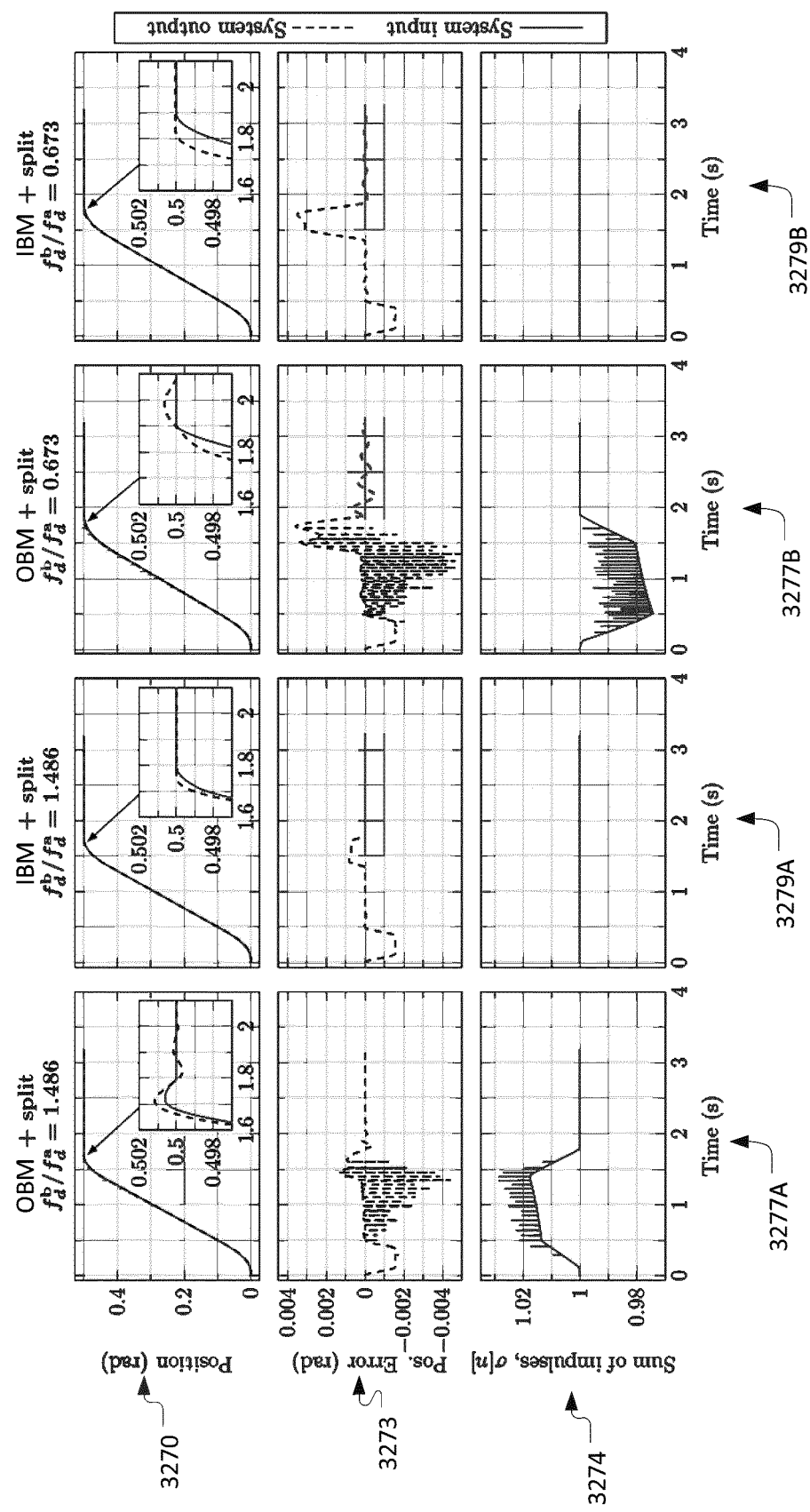
FIG. 32 illustrates position, position error and sum of impulses inputs and outputs of the simple rotational system of FIG. 27 at different situations and obtained by different methods.

The next paragraphs demonstrates the phenomenon of deviations in shaped position signal compared to unshaped position signal as introduced in paragraph [0036], which is present for the OBM when undergoing changes in damping ratio, and especially in combination with impulse splitting. Two different situations are used for illustration in FIG. 32, where:
- the charts in row 3270 illustrate the input position (solid gray line) and output position (dashed black line);
- the charts in row 3273 illustrate position error (dashed black line);
- the charts in row 3274 illustrates sum of impulses (solid gray line);

and where;
- the charts in column 3277 A relate to an input signal shaped using OBM with impulse splitting, where $f_d^b/f_d^a=1.486$;
- the charts in column 3277 B relate to an input signal shaped using OBM with impulse splitting, where $f_d^b/f_d^a=0.673$;
- the charts in column 3279A relate to an input signal shaped using IBM with impulse splitting, where $f_d^b/f_d^a=1.486$;
- the charts in column 3279B relate to an input signal shaped using IBM with impulse splitting, where $f_d^b/f_d^a=0.673$.

For example, in the situation of fhd $d^b/f_d^a=1.486$ (i.e. increasing $f_d$), it is seen that $\sigma[n]>1$ during the motion, and that this leads to a small position overshoot in the shaped position signal, which then rapidly approach the final position, leading to discontinuities in the position derivatives.

On the other hand, for $f_d^b/f_d^a=0.673$ (i.e. decreasing $f_d$), it is seen that $\sigma[n]<1$ during the motion, no overshoot is seen. However, a discontinuity in derivatives is still observed in the position signal. This is called undershoot.

These sudden standstills in position signal requires infinitely rapid changes in velocity, which again requires infinite acceleration, which is of course not physically possible. When looking at the position error, it seems like this phenomenon of overshoot or undershoot has more impact on the residual vibration, than the peaks in $\sigma[n]$ No overshooting or undershooting is seen for the IBM. This is a strong argument for choosing IBM over OBM.

Figure 33:
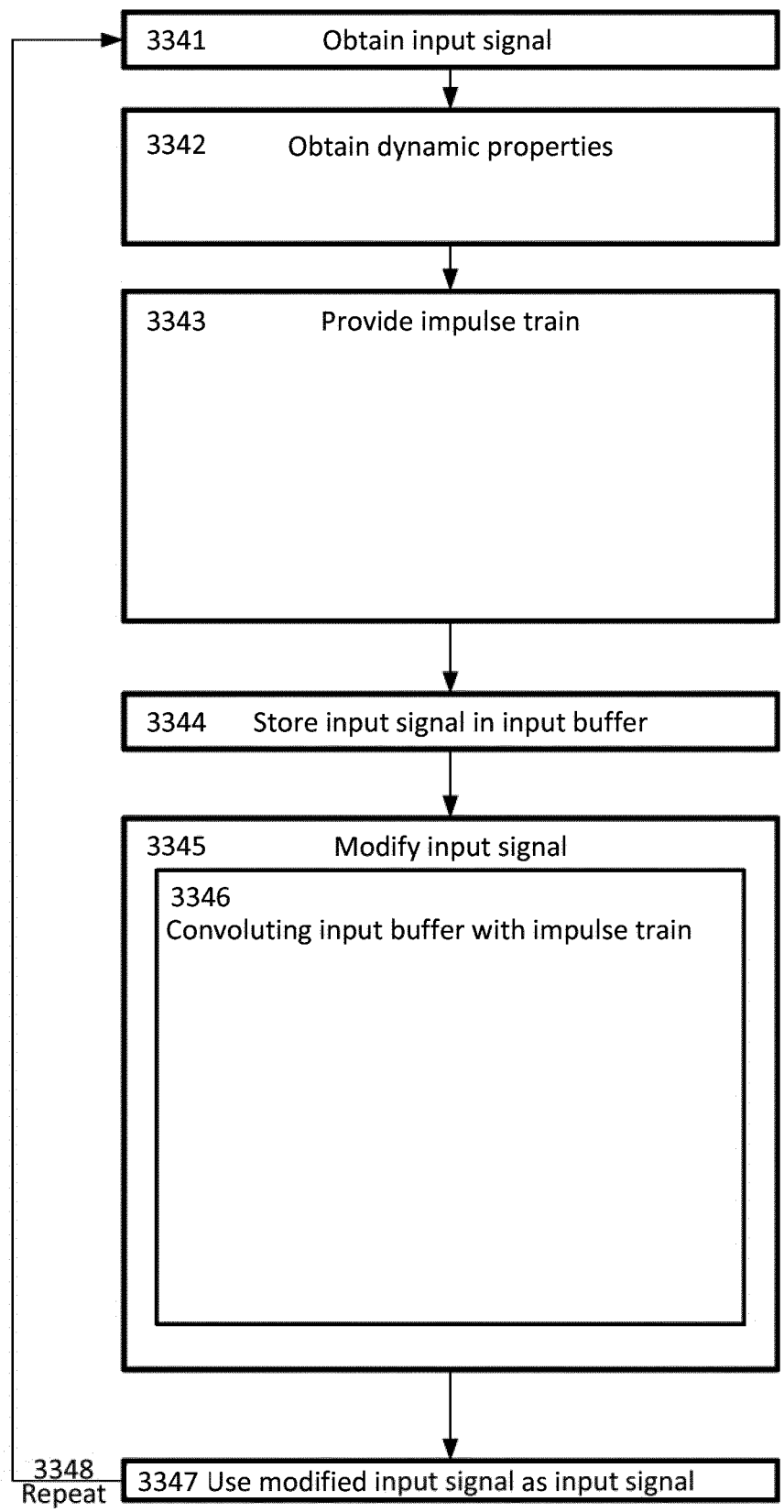
FIG. 33 illustrates a method of for generating inputs to a physical system with varying dynamic properties.

FIG. 33 illustrates a flow diagram of an embodiment of a method for generating inputs to a physical system with varying dynamic properties according to the present invention. The inputs to the physical system can for instance indicate position, velocity and/or acceleration of at least a part of the physical system and/or indicate desired torques to be provided by one or more motors of the physical system or as currents to be applied to motors of the physical system.

The method comprises a step 3341 of obtaining an input signal for the physical system at a time instant t. The input signal can be obtained as any signal serving as input for the physical system such as signals indicating position, velocity and/or acceleration of at least a part of the physical system and/or indicate desired torques to be provided by one or more motors of the physical system or as currents to be applied to motors of the physical system. The input signal can be provided as an analog signal, a digital signal and/or as data packaged inside a controller system. The input signal can for instance be provided by a target position trajectory 101 generator as described in paragraphs [0009]-[0010].

The input signal can be obtained by receiving the input signal from another device, processor, controller or the like and/or be obtained by providing the input signal internally in a processor, controller or the like. In connection with a robot comprising a plurality of robot joints, where the robot joints comprise a joint motor, the input signal can be provided as a signal indicating the position of a part of the robot and may be provided by a robot controller based on the predefined program controlling the robot.

The method comprises a step 3342 of obtaining the dynamic properties of the physical system at a time instant t. The dynamic properties can for instance indicate the eigenfrequencies or damped frequencies and damping ratios of at least a part of the physical system at the time instant t. The dynamic properties of the physical system can be obtained based on dynamic modeling of the physical system, lookup tables containing dynamic properties of the physical system, measurements of parts of the physical system, or a combination of the aforementioned.

The method comprises a step 3343 of providing an impulse train based on the dynamic properties of the physical system at time instant t. The impulse train comprises a number of impulses, having impulse magnitude and an associated impulse delay for instance as described by eq. 1 and eq. 2. The impulse train is provided as an impulse train which can be used for input shaping for instance as described in paragraphs [0011]-[0029]. The impulse train can for instance be stored in the memory of a robot controller.

The method comprises a step 3344 of storing an input of the input signal in an input buffer at the time instant t. The input buffer comprises past inputs of the input signal and can for instance be provided as a data array comprising the input of the input signal at different time instants. The input buffer can for instance be stored in a memory of a robot controller. The input buffer can for instance be implemented as a circular buffer in order to reduce the necessary amount of processor operations. For a circular buffer, the oldest input of the input signal will be overwritten at time instant t by the input of the input signal at the time instant t. This eliminates the need for moving past inputs of the input signal in the memory.

The method comprises a step 3345 of providing a modified input signal for the physical system based on the input signal and the impulse train where the step comprises a step of convolving at least a part of the input buffer with the impulse train. The convolution of the input buffer with the impulse train can be performed as known in the art of convolution for instance as described in paragraph [0020] and equation eq. 3.

This convolution with an impulse train is described by eq. 3, where the input buffer is used as q(t), q*(t) is the modified input signal, $A_i$ the magnitude of the impulse associated with impulse delays $\Delta_i$ and n the number of impulses. In discrete time the convolution between the input buffer and the impulse train comprises a step of multiplying each of the impulses with one of the past inputs of the input buffer, where the past input of the input buffer has been received at a previous time instant $t_{previous}$ corresponding to the time instant t minus the impulse delay associated with the impulse. The modified impulse signal can then be provided as a sum of the multiplied past inputs and impulses.

Once the modified input signal has been provided the method comprises a step of using the modified input signal as input for the physical system. For instance, by replacing the input signals provided by target position trajectory 101 with the modified input signal, which then are provided as inputs to the inverse dynamics 102, motor controller 103 and/or the dynamic system 104 described in paragraphs [0009]-[0010].

The method comprises a step 3348 of, at a number of different time instants, repeating the step 3341 of obtaining the input signal for the physical system, the step 3342 of obtaining the dynamic properties of the physical system; the step 3343 of providing the impulse train based on the dynamic properties of the physical system, step 3344 of storing the input of the input signal in an input buffer at the time instant t, the step 3345 of providing the modified input signal by convolving a part of the input buffer with the impulse train and the step 3347 of using the modified input signal as input for the physical system. Consequently, the method can be executed in real time and the modified input signal for the physical system can be adapted in real time.

Figure 34:
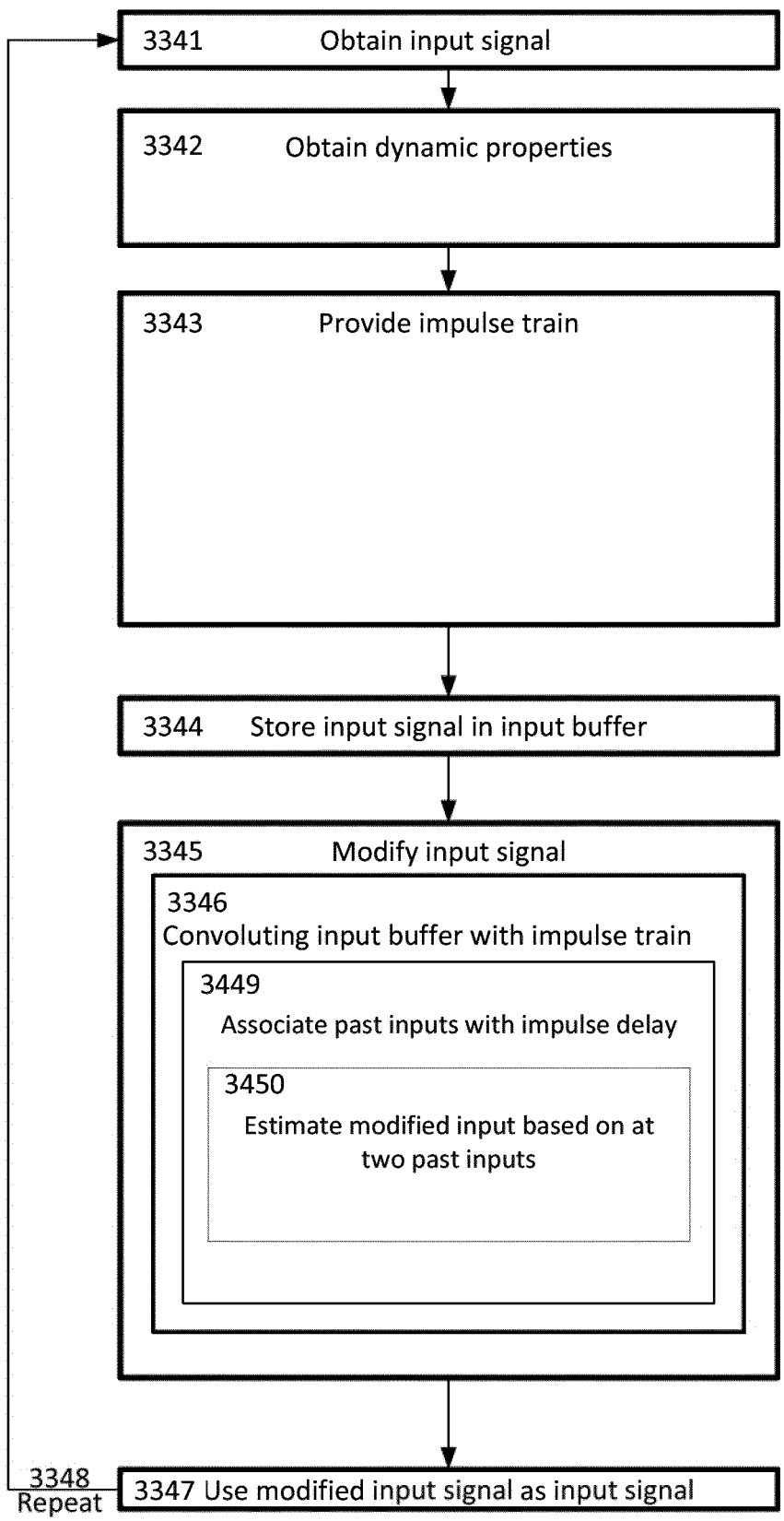
FIG. 34 illustrates another embodiment of a method of for generating inputs to a physical system with varying dynamic properties.

FIG. 34 illustrates a flow diagram of an embodiment of a method for generating inputs to a physical system with varying dynamic properties according to the present invention. The method is like the method illustrated in FIG. 33 and similar method steps have been given the same reference numbers as in FIG. 33 and will not be described further. In this embodiment step 3346 of convoluting at least a part of the input buffer with the impulse train comprises a step 3449 of associating at least one of the past inputs of the input buffer with at least one of the impulse delays of the impulse train. This makes it possible to ensure that the impulses of the impulse train are provided at the points in time, which are provided by the impulse time delays. The past inputs of the input buffer can for instance be associated with the impulse delay by identifying the past input of the input buffer, which has been received at a previous time instant $t_{previous}$ closest to the time instant t minus the impulse delay associated to which the past input shall be associated.

In this embodiment the step 3449 of associating at least one of the past inputs of the input buffer with at least one of the impulse delays of the impulse train comprises a step 3450 of obtaining the magnitude of the at least one past input associated with the impulse delay based on at least two past inputs obtained at different time instants. This makes it possible to provide a good estimation of the past inputs of the input signal at the time of the impulse delay. The magnitude of the past input at the time of an impulse delay can be provided by interpolation using at least two of the past inputs of the input buffer, for instance as illustrated in. FIG. 21 and described in paragraph [0061], where the magnitude of the past input associated with the impulse delay can be obtained based on at least two constructive past inputs where the impulse delay lies between the constructive past inputs. The past inputs of the input signal can thus be expressed as interpolation between past inputs of the input buffer.

For instance the interpolation method can be Lagrange interpolation of 1st, 2nd, 3rd, 4th or higher than 4th degree.

Figure 35:
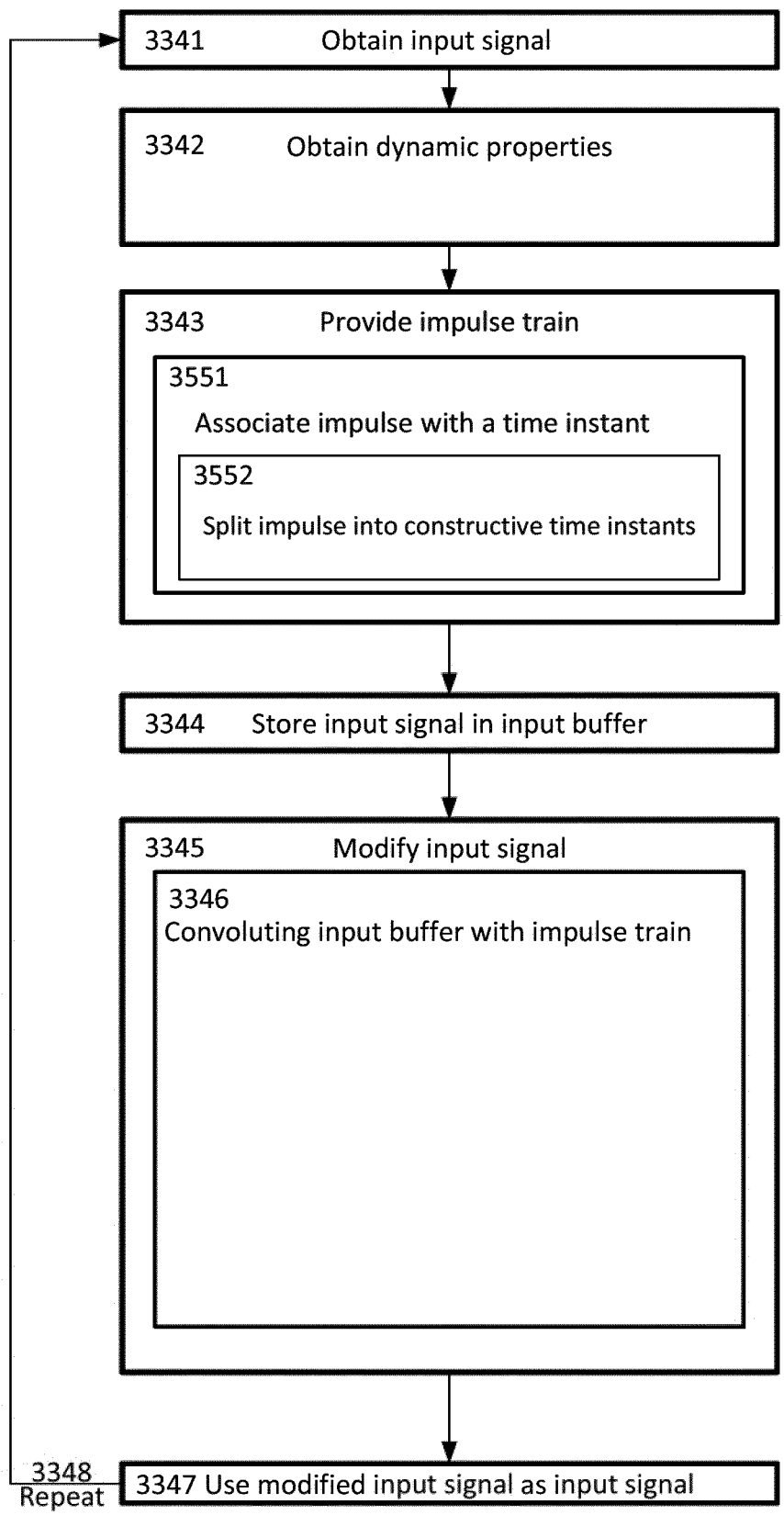
FIG. 35 illustrates another embodiment of a method of for generating inputs to a physical system with varying dynamic properties.

FIG. 35 illustrates a flow diagram of an embodiment of a method for generating inputs to a physical system with varying dynamic properties according to the present invention. The method is like the method illustrated in FIG. 33 and similar method steps have been given the same reference numbers as in FIG. 33 and will not be described further. In this embodiment step 3343 of providing the impulse train based on the dynamic properties of the physical system comprises as step 3551 of associating the impulses of the impulse train with impulse delays corresponding to the different time instants. This ensures that the impulses can be applied to past inputs of the input buffer at the right timing in relation to the time intervals at which the past inputs of the input buffer have be obtained. This can for instance be obtained by step 3552 of splitting the impulse magnitude into at least two constructive different time instants, as described in paragraph [0029].

It is noted that the methods illustrated in FIGS. 33-35 can be combined into one method and that the method steps of the methods can be performed in alternative orders, for instance step 3344 of storing the input signal in the input buffer can be performed before step 3342 of obtaining the dynamic properties of the physical system and/or the step 3343 of providing the impulse train.

In one embodiment the dynamic properties obtained in step 3342 are obtained based on at least one of:
- the input signal;
- the modified input signal;
- at least one sensor indicating a property of the physical system.

The inputs signal indicates the desired state of the physical system and can thus be used to obtain the dynamic properties of the physical system for instance using the input signal together with a look-up table comprising the dynamic properties of the physical system at various states, similar the input signal can be used as input for a formula indicating the dynamic properties of the physical system as function of various input states indicated by the input signal. Similar the modified input signal can be used to determine the dynamic properties of the physical system. For instance by using the previously obtained modified input signal to determine the dynamic properties may be a good estimation of the actual physical state of the physical system. Determining the dynamic properties of the physical system based on the input signal and/or the modified input signal makes it possible to determine the dynamic properties of the physical system without using encoder and or sensors of obtaining the state of the physical system, whereby eventual measuring error of such sensors can be avoided.

In addition to or alternatively to determining the dynamic properties of the physicals system based on the input signal and/or modified input signal the dynamic properties can be determined based on sensors indicating the physical state of the physical system. This makes it possible to obtain the actual state of the physical system and thus obtain the dynamic properties of the physical system, further this makes it possible to correct eventual error between the actual state of the physical system as state of the physical system indicated by the input signal and/or modified input signal. The sensors can for instance be accelerometers, gravity sensors, encoders indicating orientations/positions of the physical system, visual systems like cameras, 3D depth cameras which can be used to obtain the physical state of the physical system and thereby obtain the dynamic parameter of the physical system.

In one embodiment the dynamic parameters of the physical system can be determined based on a combination of at least two of the input signal, modified input signal and at least one sensor indicating the property of the physical system.

The input signal can for instance be indicative of the position of at least a part of the physical system. This makes it possible to adjust the physical system by changing the position of a part of the physical system based on the input signal and eventual vibrations can be reduced by adjusting the physical system based on a modified input signal indicating the position of at least a part of the physical system. For instance, the input signal can indicate the position of parts of a mechanical system such as a robot arm, where the position of a tool flange can be indicated in relation to the base of the robot, the angle of robot joints can be indicated or any other position of parts of the robot.

The input signal can for instance be indicative of the velocity of at least a part of the physical system. This makes it possible to adjust the physical system by changing the velocity of a part of the physical system. Eventual vibrations can be reduced by providing a modified input signal indicating the velocity of at least a part of the physical system. For instance, the input signal can indicate the velocity of parts of a mechanical system such as a robot arm, where the velocity of a tool flange can be indicated in relation to the base of the robot, the angular velocity of robot joints can be indicated or any other velocity of parts of the robot can be indicated.

The input signal can for instance be indicative of the acceleration of at least a part of the physical system. This makes it possible to adjust the physical system by changing the acceleration of a part of the physical system based on the input signal and eventual vibrations can be reduced by adjusting the physical system based on a modified input signal indicating the acceleration of at least a part of the physical system. For instance, the input signal can indicate the acceleration of parts of a mechanical system such as a robot arm, where the position of a tool flange can be indicated in relation to the base of the robot, the angular acceleration of robot joints can be indicated or any other acceleration of parts of the robot.

As known in the field of physics the position, the velocity and the acceleration of a part of the physical system relates to each other by their derivatives. An input signal indicating a position can thus be used to obtain an input signal indicating the velocity and/or an input signal indicating acceleration by differentiating the input signal.

The input signal can for instance be indicative of a force/torque applied to at least a part of the physical system. This makes it possible to adjust the physical system by changing the force/torque of a part of the physical system based on the input signal and eventual vibrations can be reduced by adjusting the physical system based on a modified input signal indicating the force/torque of at least a part of the physical system. For instance, the input signal can indicate the force/torque applied to parts of a mechanical system such as a robot arm, such as a force applied to the tool flange of a robot arm and/or the torque provided to the robot joints can be indicated by the input signal.

The input signal can for instance be indicative of an electrical current of at least a part of the physical system. This makes it possible to adjust the physical system by changing the electrical current of a part of the physical system based on the input signal and eventual vibrations can be reduced by adjusting the physical system based on a modified input signal indicating the electrical current of at least a part of the physical system. For instance, the input signal can indicate the electrical current through a joint motor of a robot joint of a robot arm, whereby the force/torque provided by the motor can be regulated based on the input signal and/or modified input signal indicating the electrical current.

The dynamic properties can indicate the damping ratio $\zeta$ of the physical system, the natural frequency of the physical system $\omega_n$ and/or the damped frequency of the physical system $\omega_d$, where the damping ratio $\zeta$ indicates a dimensionless measure, which describes how rapidly the oscillations of a system is decaying with time, the natural frequency indicates the frequency of vibration for an oscillating system, where damping effects are not taken into account and the damped frequency indicates the frequency of vibration for an oscillating system, where dampening effects are taken into account. For instance, for the dynamic system in FIG. 16, $\zeta = c/(2\sqrt{km})$, $\omega_n = \sqrt{k/m}$ and $\omega_d = \sqrt{1-\zeta^2} \cdot \omega_n$, where k denotes the spring stiffness, m denotes the system mass, and c denotes system damping. Here $\omega_n$ and $\omega_d$ has the unit of rad/s. Sometimes it is convenient to express the damped frequency as $f_d = \omega_d/(2\pi)$, which is the damped frequency with the unit of Hz.

In one embodiment the physical system is a robot comprising a plurality of robot joints, where the robot joints comprise a joint motor. The robot comprises a robot controller configured to control the torque provided by the joint motor based on a modified input signal where the robot controller is configured to obtain the modify input signal based on an input signal for the robot by utilizing the method described previously. Consequently, the vibrations during movement of the robot can be reduced and the advantages described in the previously can be achieved.

FIG. 36 illustrates a robot arm 3689 comprising a plurality of robot joints 3690A, 3690B, 3690C, 3690D, 3690E, 3690F connecting a robot base 3691 and a robot tool flange 3692. A base joint 3690A is configured to rotate the robot arm around a base axis 3693A (illustrated by a dashed dotted line) as illustrated by rotation arrow 3694A; a shoulder joint 3690B is configured to rotate the robot arm around a shoulder axis 3693B (illustrated as a cross indicating the axis) as illustrated by rotation arrow 3694B; an elbow joint 3690C is configured to rotate the robot arm around an elbow axis 3693C (illustrated as a cross indicating the axis) as illustrated by rotation arrow 3694C, a first wrist joint 3690D is configured to rotate the robot arm around a first wrist axis 3693D (illustrated as a cross indicating the axis) as illustrated by rotation arrow 3694D and a second wrist joint 3690E is configured to rotate the robot arm around a second wrist axis 3693E (illustrated by a dashed dotted line) as illustrated by rotation arrow 3694E. Robot joint 3690F is a tool joint comprising the robot tool flange 3692, which is rotatable around a tool axis 3693F (illustrated by a dashed dotted line) as illustrated by rotation arrow 3694F. The illustrated robot arm is thus a six-axis robot arm with six degrees of freedom, however it is noticed that the present invention can be provided in robot arms comprising less or more robot joints.

Each of the joints comprises an output flange rotatable in relation to the robot joint and the output flange is connected to a neighbor robot joint either directly or via an arm section as known in the art. The robot joint comprises a joint motor configured to rotate the output flange, for instance via a gearing or directly connected to the motor shaft.

The robot arm comprises at least one robot controller 3695 configured to control the robot joints by controlling the motor torque provided to the joint motors based on a dynamic model of the robot and the joint sensor signal. The robot controller 3695 can be provided as a computer comprising an interface device 3696 enabling a user to control and program the robot arm. The controller can be provided as an external device as illustrated in FIG. 36 or as a device integrated into the robot arm. The interface device can for instance be provided as a teach pendent as known from the field of industrial robots which can communicate with the controller via wired or wireless communication protocols. The interface device can for instanced comprise a display 3697 and a number of input devices 3698 such as buttons, sliders, touchpads, joysticks, track balls, gesture recognition devices, keyboards etc. The display may be provided as a touch screen acting both as display and input device.

The robot controller is configured to at a time instant t obtaining and input signal for the robot. The input signal can for instance indicate position, velocity and/or acceleration of at least a part of the robot arm and/or indicate desired torques to be provided by one or more robot motors of robot joints or as currents to be applied to robot motors. The input signal can be obtained by receiving the input signal from another device, processor, controller or the like and/or be obtained internally within the robot controller. For instance the input signal may be generated based on a robot program stored in a memory of the robot controller and comprising a number of instructions for the robot. For instance, the input signal may indicate the position, velocity, and/or acceleration of the robot tool flange in relation the robot base; angular position, angular velocity and/or angular acceleration of the robot joints/robot motors.

The robot controller is configured to at the time instant t storing an input of the input signal in an input buffer, where the input buffer comprises past inputs of the input signal. The input buffer can for instance be stored in a memory of the robot controller such as a data array comprising the input of the input signal at different time instants. The input buffer can for instance be implemented as a circular buffer in order to reduce the necessary amount of processor operations. For a circular buffer, the oldest input of the input signal will be overwritten at time instant t by the input of the input signal at the time instant t. This eliminates the need for moving past inputs of the input signal in the memory.

The robot controller is configured to at the time instant t obtaining dynamic properties of the robot; The dynamic properties of the robot can for instance indicate the natural frequencies (eigenfrequencies), damped frequencies and/or damping ratios of at least a part of the robot at the time instant t. The dynamic properties of the robot can be obtained based on dynamic modeling of the robot, lookup tables containing dynamic properties of the robot, measurements of parts of the robot, or a combination of the aforementioned.

The robot controller is configured to at the time instant t providing an impulse train based on the dynamic properties, where the impulse train comprises a number of impulses. The impulse train comprises a number of impulses, having impulse magnitude and an associated impulse delay for instance as described by eq. 1 and eq. 2. The impulse train is provided as an impulse train which can be used for input shaping for instance as described in paragraphs [0011]-[0029]. The impulse train can for instance be stored in the memory of a robot controller.

The robot controller is configured to provide a modified input signal based on the input signal and the impulse train by convolving at least a part of the input buffer with the impulse train. The convolution of the input buffer with the impulse train can be performed as known in the art of convolution for instance as described in paragraph [0020] and equation eq. 3. This convolution with an impulse train is described by eq. 3, where the input buffer is used as q(t), q*(t) is the modified input signal, $A_i$ the magnitude of the impulse associated with impulse delays $\Delta_i$ and n the number of impulses. In discrete time the convolution between the input buffer and the impulse train comprises a step of multiplying each of the impulses with one of the past inputs of the input buffer, where the past input of the input buffer has been received at a previous time instant $t_{previous}$ corresponding to the time instant t minus the impulse delay associated with the impulse. The modified impulse signal can then be provided as a sum of the multiplied past inputs and impulses.

The robot controller is then configured to control the robot based on the modified input signal and to repeat obtaining the input signal, storing the input of the input signal in an input buffer, obtaining the dynamic properties of the robot, providing the impulse train based on the dynamic properties, providing the modified input signal by convolving a part of the input buffer with the impulse train and controlling the robot based on the modified input signal. Consequently, the robot can drive in real time reducing the vibrations of the robot.

It is noted that the robot controller can be configured to carry out the method steps as illustrated in FIG. 33-35 and described in paragraphs [0095]-[0119].

Throughout the application the impulse train have been describes as an impulse train configured to reduce the vibrations of the physical system/robot, however it should be noticed that the impulse train also can be generated in order to introduce certain vibrations into the physical system/robot. For instance in a situation where the physical system/robot is arranged on a vibrating object and where vibrations is added to the physical system/robot in order to reduce the vibrations of the physical system/robot in relation to a reference point separated from the vibrating object.

The present invention can also be described according to the following statements numbered in roman numerals:

I. A method for generating inputs to a physical system with varying dynamic behavior to reduce time-varying unwanted dynamics in the system response comprising the steps of:
- obtaining a quantification of the time-varying unwanted dynamics at time instant t; p1 establishing a filter comprising a sequence of two or more input impulses for the system, which reduces dynamic response of the time-varying unwanted dynamics;
- providing a description of a relation of the inputs to the filter up until time instant t or a subset thereof;
- convolving the filter inputs with the impulse sequence using the provided description.

II. The method of statement I, wherein the physical system is selected from the group consisting of: i) a robot with 2, 3, 4, 5, 6, 7, 8 or more than 8 degrees of freedom, ii) a collaborative robot with 2, 3, 4, 5, 6, 7, 8 or more than 8 degrees of freedom, iii) a manipulator 2, 3, 4, 5, 6, 7, 8 or more than 8 degrees of freedom, iv) a robotic device or v) an industrial robot with 2, 3, 4, 5, 6, 7, 8 or more than 8 degrees of freedom.

III. The method of statement I or II, wherein the description of relation of previous filter input states is expressed as interpolation between data points.

IV. The method of statement III, wherein the interpolation is Lagrange interpolation of 1st, 2nd, 3rd, 4th or higher than 4th degree.

V. The method of any one of the preceding statements, wherein the quantified unwanted dynamics constitutes vibration characterized by an undamped natural frequency $\omega_1$ and a damping ratio $\zeta_1$ and the impulse sequence is established by solving:

$$\sum_{j=1}^{N} A_j = 1 \quad \text{eq. 8}$$

$$\Delta_1 = 0 \quad \text{eq. 9}$$

$$\sum_{j=1}^{N} B_j \cos(\phi_j) = 0 \quad \text{eq. 10}$$

$$\sum_{j=1}^{N} B_j \sin(\phi_j) = 0 \quad \text{eq. 11}$$

$$\frac{d}{d\omega_1}\left[\sum_{j=1}^{N} B_j \cos(\phi_j)\right] = 0 \quad \text{eq. 12}$$

$$\frac{d}{d\omega_1}\left[\sum_{j=1}^{N} B_j \sin(\phi_j)\right] = 0 \quad \text{eq. 13}$$

$$\vdots$$

$$\frac{d^M}{d\omega_1^M}\left[\sum_{j=1}^{N} B_j \cos(\phi_j)\right] = 0 \quad \text{eq. 14}$$

$$\frac{d}{d\omega_1}\left[\sum_{j=1}^{N} B_j \sin(\phi_j)\right] = 0; \quad \text{eq. 15}$$

where $$B_j = \frac{A_j \omega_1}{\sqrt{1-\zeta_1^2}} e^{-\zeta_1 \omega_1 (\Delta_N - \Delta_j)} \quad \text{eq. 16}$$

$$\phi_j = \omega_1 \Delta_j \sqrt{1-\zeta_1^2} \quad \text{eq. 17}$$

$$N = M + 2 \quad \text{eq. 18}$$

N=2, 3, 4, 5, 6, 7, 8 or more than 8 is the number of impulses in the sequence, M is the highest order derivative in the constraint equations, $A_{1 \ldots N}$ is the magnitude of the impulses, and $\Delta_{1 \ldots N}$ is the timing of the impulses.

Equations eq. 8-eq. 18 of statement V. can be described as:
- eq. 8 is a constraint equation, constraining that the sum of all impulse magnitudes in the impulse train has unit value.
- eq. 9 is a constraint equation, constraining the delay of the first impulse to be 0. This is to avoid unnecessary delay introduced by the filter.
- eq. 10 and eq. 11 are constraint equations constraining the total system response to be zero after applying the impulse train to the physical system.
- eq. 12 to eq. 15 are constraint equations, constraining the derivates of eq. 10 and eq. 11 with respect to undamped natural frequency $\omega_1$ up until the $M^{th}$ order derivative. For instance if M=0, a ZV (zero vibration) filter is obtained, if M=1, a ZVD (zero vibration and $1^{st}$ order derivative) filter is obtained, and if M=2, a ZVDD (zero vibration and $1^{st}+2^{nd}$ order derivative) filter is obtained.
- eq. 16 is a simplifying expression, introducing $B_j$, which is related to the amplitude of dynamic response originating from impulse j.
- eq. 17 is a simplifying expression, introducing $\Phi_j$, which is related to the phase angle of the dynamic response originating from impulse j.
- eq. 18 expresses the number of impulses, N, which is necessary to obtain a filter, which constrains the magnitude of the $M^{th}$ order derivative with respect to undamped natural frequency.

VI. The method of any one of the preceding statements, wherein the unwanted dynamics is quantified using mathematical modeling or mathematical modeling based on finite element methods, symbolic Lagrangian methods, lumped parameter methods, transfer matrix methods, assumed mode methods or a combination thereof.

VII. The method of statement 6, wherein the unwanted dynamics is quantified based on the newest filter input, on filter output or on the newest filter output.

VIII. The method of any one of the statements I-V, wherein the unwanted dynamics is quantified based on the use of pre-estimated values, such as lookup tables.

IX. The method of any one of the statements I-V, wherein the unwanted dynamics are quantified based on measured accelerations, on measured positions or angles or on sensor readings consisting of other measurements than accelerations, positions or angles.

X. The method of any one of the preceding statements, wherein 2, 3, 4, 5, 6, 7, 8, 9, 10, 11, 12 or more than 12 impulse sequences are convolved in series.

XI. The method of any one of statements I-VIII, wherein 2, 3, 4, 5, 6, 7, 8, 9, 10, 11, 12 or more than 12 impulse sequences are convolved in series and the unwanted dynamics used for establishing each impulse sequence is quantified by utilizing information about previous outputs from the filter.

XII. The method of any one of the preceding statements, wherein the filter input is a position or angle signal and the shaped filter output is differentiated numerically to obtain its derivatives.

Another aspect of the present invention can also be described according to the following statements numbered in roman numerals XIII-XIV:

XIII. A method of obtaining dependent inputs for an actuator consisting of a position signal and position derivatives without phase shift in the derivatives comprising the steps of:

numerical central difference differentiation where 3, 5, 7, 9, 11, 13 or more than 13 position data points are used for derivative approximations; delaying the filter output signals with 1, 2, 3, 4, 5, 6 or more than 6 discrete time step(s) or pre-determining the position signal of 1, 2, 3, 4, 5, 6 or more than 6 discrete time step(s) forward in time to address the non-causal nature of the central difference differentiation.

XIV. The method of statement XII, wherein the numerical differentiation is backward difference differentiation or the method of statement XIII.

BRIEF DESCRIPTION OF FIGUR REFERENCES

| | |
|---|---|
| 101 | trajectory generator |
| 102 | inverse dynamics |
| 103 | motor controller |
| 104 | dynamic system |
| 205, 405 | first response |
| 206, 406 | second response |
| 407 | third response |
| 208, 408 | total response |
| 309, 809, 2109 | impulse train |
| 510 | chart of unshaped input signal |
| 511 | unshaped input signal |
| 512 | chart of unshaped input signal |
| 513 | unshaped input signal |
| 514 | input signal convoluted with first impulse |
| 515 | input signal convoluted with second impulse |
| 616, 1116, 2516A, 2516B, 2516C | input shaping filter |
| 718, 818, 2118, 2218, 2618 | Discrete input signal |
| 719, 2219, 2619A, 2916B, 2619C | Discrete impulse train |
| 720, 820, 2120, 2220, 2620 | Discrete shaped inputs signal (output signal) |
| 821 | Discrete times |
| 922, 1022, 1722, 1822, 1922, 2322 | Input Acceleration as function of time |
| 923, 1023, 1723, 1823, 1923, 2323 | Input Velocity as function of time |
| 924, 1024, 1724, 1824, 1924, 2324 | Input Position as function of time |
| 1125 | numerical differentiator |
| 1626 | Spring |
| 1627 | damper |
| 1628 | mass |
| 1729, 1829, 1929, 2329 | Output Acceleration as function of time |
| 1730, 1830, 1930, 2330 | Output Velocity as function of time |
| 1731, 1831, 1931, 2331 | Output Position as function of time |
| 2032, 2432 | Sum of applied impulses |
| 2133, 2233, 2633 | input buffer |
| 2234 | previous shaped input signal (output) |
| 3341 | Provide input signal |
| 3342 | Obtain dynamic properties |
| 3343 | Provide impulse train based on dynamic properties |
| 3344 | Store input of input signal in input buffer |
| 3345 | Modify input signal |
| 2246, 2646A, 2646B, 2646C, 3346 | convolving input buffer with input train. |
| 3347 | use modified input signal as input signal |
| 3348 | Repeat at different time instants |
| 3449 | Associate past input with impulse delay |
| 3450 | Estimate modified input amplitude based on constructive past inputs |
| 3551 | Associate impulse with time instant |
| 3552 | Split impulse into constructive time instants |
| 2761 | Rotational input signal |
| 2762 | Rotational output signal |
| 2863 | damped freguency |
| 2864 | damping ratio |
| 2970, 3270 | charts of input position and output position |
| 2971 | charts of input velocity and output velocity |
| 2972 | charts of input acceleration and output acceleration |
| 2973, 3273 | charts of position error |
| 2974, 3274 | charts of sum of impulses |
| 2975 | charts relating to an unshaped input signal |
| 2976 | charts relating to an input signal shaped using OBM without impulse splitting |
| 2977, 3277A; 3277B | charts relating to an input signal shaped using OBM with impulse splitting |
| 2978 | charts relating to an input signal shaped using IBM without impulse splitting |
| 2979, 3279A; 3279B | charts relating to an input signal shaped using IBM with impulse splitting |
| 2980 | Position peaks of OBM |
| 2981 | Peaks of sum of impulses of OBM |
| 2982 | peaks in input velocity of OMB + split |
| 2983 | peaks in input acceleration of OMB + split |
| 2984 | Peaks of sum of impulses of OBM + split |
| 2985 | peaks in input velocity of IBM |
| 2986 | peaks in input acceleration of IBM |
| 3087 | Grid plot of residual vibration of the IBM method with impulse splitting |
| 3090 | Grid plot of the residual vibration of the OBM method with impulse splitting 3091 |
| 3689 | robot arm |
| 3690 | robot joint |
| 3691 | robot base |
| 3692 | robot tool flange |
| 3693 | axis of rotation |
| 3694 | rotation arrow |
| 3695 | robot controller |
| 3696 | interface device |
| 3697 | display |
| 3698 | input device |

REFERENCES

[1] ISO 8373:2012—robots and robotic devices—vocabulary.

[2] O. J. M. Smith. Posicast control of damped oscillatory systems. Proceedings of the IRE, 45(9): 1249-1255, Sept 1957.

[3] O. J. M. Smith. Feedback control systems. McGraw-Hill, 1958.

[4] John F. Calvert and Donald J. Gimpel. Method and apparatus for control of system output in response to system input, 1957. U.S. Pat. No. 2,801,351.

[5] Niel C. Singer. Residual vibration reduction in computer controlled machines. PhD thesis, Massachusetts Institute of Technology. Dept. of Mechanical Engineering., 1989.

[6] N. C. Singer, W. P. Seering, and K. A. Pasch. Shaping command inputs to minimize unwanted dynamics, April 10 1990. U.S. Pat. No. 4,916,635.

[7] Neil C. Singer and Warren P. Seering. Preshaping command inputs to reduce system vibration. Journal of Dynamic Systems, Measurement, and Control, 112(1): 76-82, 1990.

[8] W. E. Singhose, W. P. Seering, and N. C. Singer. Shaping inputs to reduce vibration: a vector diagram approach. In Proceedings., IEEE International Conference on Robotics and Automation, pages 922-927 vol. 2, May 1990.

[9] W Seering and N Singer. Residual vibration reduction using vector diagrams to generate shaped inputs. Journal of Mechanical Design, 116(2), 1994.

[10] William Singhose, Lisa J. Porter, and Neil Singer. Vibration reduction using multi-hump extra-insensitive input shapers, 1995.

[11] W E Singhose, Warren P Seering, and Neil C Singer. Input shaping for vibration eduction with specified insensitivity to modeling errors. Japan-USA Sym. on Flexible Automation, 1:307-13, 1996.

[12] Jinjun Shan, Hong-Tao Liu, and Dong Sun. Modified input shaping for a rotating singlelink flexible manipulator. Journal of Sound and Vibration, 285(1): 187-207, 2005.

[13] T. D. Tuttle and W. P. Seering. A zero-placement technique for designing shaped inputs to suppress multiple-mode vibration. In American Control Conference, 1994, volume 3, pages 2533-2537 vol. 3, June 1994.

[14] Lucy Y Pao. Multi-input shaping design for vibration reduction. Automatica, 35(1): 81-89, 1999.

[15] J. Vaughan and W. Singhose. Reducing vibration and providing robustness with multi-input shapers. In 2009 American Control Conference, pages 184-189, June 2009.

[16] B Whitney Rappole. Minimizing residual vibrations in flexible systems. Master's thesis, MIT Artificial Intelligence Laboratory, 1992.

[17] David P Magee and Wayne John Book. The application of input shaping to a system with varying parameters. In Japan/USA Symposium on Flexible Automation, volume 1, pages 519-526, 1992.

[18] W. E. Singhose, N. C. Singer, S. J. Derezinski, B. W. Rappole, and K. Pasch. Method and apparatus for minimizing unwanted dynamics in a physical system, June 10 1997. U.S. Pat. No. 5,638,267.

[19] R. A. Fowell. Robust resonance reduction using staggered posicast filters, March 11 1997. U.S. Pat. No. 5,610,848.

[20] D. P. Magee and W. J. Book. Optimal arbitrary time-delay (oat) filter and method to minimize unwanted system dynamics, June 20 2000. U.S. Pat. No. 6,078,844.

[21] R. F. Eloundou and W. E. Singhose. Command generation combining input shaping and smooth baseline functions, July 19 2005. U.S. Pat. no. 6,920,378.

[22] N. Singer. Dynamic system control method, October 7 2008. U.S. Pat. No. 7,433,144.

[23] William Singhose. Command shaping for flexible systems: A review of the first 50 years. International Journal of Precision Engineering and Manufacturing, 10(4): 153-168, 2009.

[24] Cheol Hoon Park, Dong II Park, and Joo Han Park. Vibration control of flexible mode for a beam-type substrate transport robot. International Journal of Advanced Robotic Systems, 10, 2013.

[25] A. Tzes and S. Yurkovich. An adaptive input shaping control scheme for vibration suppression in slewing flexible structures. IEEE Transactions on Control Systems Technology, 1(2): 114-121, Jun 1993.

[26] Jung-Keun Cho and Youn-Sik Park. Vibration reduction in flexible systems using a time-varying impulse sequence. Robotica, 13(3): 305-313, 005 1995.

[27] Hyung-Soon Park, P. H. Chang, and Jong-Sung Hur. Time-varying input shaping technique applied to vibration reduction of an industrial robot. In Intelligent Robots and Systems, 1999. IROS '99. Proceedings. 1999 IEEE/RSJ International Conference on, volume 1, pages 285-290 vol. 1, 1999.

[28] Pyung Hun Chang and Hyung-Soon Park. Time-varying input shaping technique applied to vibration reduction of an industrial robot. Control Engineering Practice, 13(1): 121-130, 2005.

[29] K. G. McConnell and W. S. Jang. Robot control scheme, January 14 1997. U.S. Pat. No. 5,594,309.

[30] R. Kinceler and P. H. Meckl. Corrective input shaping for a flexible-joint manipulator. In Proceedings of the 1997 American Control Conference (Cat. No. 97CH36041), volume 3, pages 1335-1339 vol. 3, Jun 1997.

[31] V. M. Beazel and P. H. Meckl. Command shaping applied to nonlinear systems with configuration-dependent resonance. In Proceedings of the 2005, American Control Conference, 2005., pages 539-544, June 2005.

[32] W. Chatlatanagulchai, V. M. Beazel, and P. H. Meckl. Command shaping applied to a flexible robot with configuration-dependent resonance. In 2006 American Control Conference, pages 6 pp.-, June 2006.

[33] T. R. Kurfess. Robotics and Automation Handbook. CRC Press, 2004.

[34] M. O. Tokhi and A. K. M. Azad. Flexible Robot Manipulators: Modelling, Simulation and Control. Control, Robotics and Sensors Series. Institution of Engineering and Technology, 2008.

[35] Peter Hubinsk y and Peter Hauptle. Reducing oscillations during positioning of a servomechanism having flexibility. Journal of Electrical Engineering, 63(4): 201-212, 2012.

[36] B. R. Murphy and I. Watanabe. Digital shaping filters for reducing machine vibration. IEEE Transactions on Robotics and Automation, 8(2): 285-289, Apr 1992.

[37] J. M. Hyde and W. P. Seering. Using input command pre-shaping to suppress multiple mode vibration. In Proceedings. 1991 IEEE International Conference on Robotics and Automation, pages 2604-2609 vol. 3, Apr 1991.

[38] W. Singhose and L. Pao. A comparison of input shaping and time-optimal flexible-body control. Control Engineering Practice, 5(4): 459-467, 1997.

[39] Victor Maxwell Beazel. Command shaping applied to nonlinear systems with configuration-dependent resonance. PhD thesis, Purdue University, 2004.

[40] Giuseppe Prisco and David J. Rosa. Robotic surgical system with joint motion controller adapted to reduce instrument tip vibrations, 2010. US Patent 2010/145521.

[41] T. I. Laakso, V. Valimaki, M. Karjalainen, and U. K. Laine. Splitting the unit delay —tools for the fractional delay filter design. IEEE Signal Processing Magazine, 13(1): 30-60, Jan 1996.

[42] M. Geradin and A. Cardona. Kinematics and dynamics of rigid and flexible mechanisms using finite elements and quaternion algebra. Computational Mechanics, 4(2): 115-135, 1988.

[43] Parveen Kalra and Anand M Sharan. Accurate modelling of flexible manipulators using finite element analysis. Mechanism and Machine Theory, 26(3): 299-313, 1991.

[44] Sabri Cetinkunt andWayne J Book. Symbolic modeling and dynamic simulation of robotic manipulators with compliant links and joints. Robotics and Computer-Integrated Manufacturing, 5(4): 301-310, 1989.

[45] W. Khalil and M. Gautier. Modeling of mechanical systems with lumped elasticity. In Proceedings 2000 ICRA. Millennium Conference. IEEE International Conference on Robotics and Automation. Symposia Proceedings (Cat. No. 00CH37065), volume 4, pages 3964-3969 vol. 4, 2000.

[46] E. C. Pestel and F. A. Leckie. Matrix Methods in Elasto Mechanics. McGraw-Hill, 1963.

[47] Xiaoting Rui, Guoping Wang, Yuqi Lu, and Laifeng Yun. Transfer matrix method for linear multibody system. Multibody System Dynamics, 19(3): 179-207, 2008.

[48] G. Hastings and W. Book. A linear dynamic model for flexible robotic manipulators. IEEE Control Systems Magazine, 7(1): 61-64, February 1987.

[49] L. Biagiotti, C. Melchiorri, Trajectory Planning for Automatic Machines and Robots, Springer-Verlag Berlin Heidelberg, 2008.

The invention claimed is:

1. A method for generating inputs to a physical system having dynamic properties, the method comprising:
at a time t, obtaining an input signal for the physical system;
obtaining the dynamic properties of the physical system;
providing an impulse train based on the dynamic properties, where the impulse train comprises a number of impulses;
providing a modified input signal for the physical system based on the input signal and the impulse train;
using the modified input signal as input for the physical system; and
storing an input based on the input signal in a buffer, where the buffer also stores past inputs based on the input signal;
wherein providing the modified input signal comprises convolving at least a part of content of the buffer with the impulse train; and
wherein impulses of the impulse train have an impulse magnitude and an associated impulse delay, and wherein convolving at least part of the content of the buffer with the impulse train comprises multiplying each impulse magnitude with one of the past inputs from the buffer, where a past input from the buffer is received at a previous time $t_{previous}$ corresponding to the time t minus an impulse delay associated with an impulse.

2. The method of claim 1, wherein the following operations are repeated multiple times at different times:
obtaining an input signal for the physical system;
obtaining the dynamic properties of the physical system;
providing an impulse train based on the dynamic properties, where the impulse train comprises a number of impulses;
providing a modified input signal for the physical system based on the input signal and the impulse train;
using the modified input signal as input for the physical system;
storing an input based on the input signal in the buffer; and
convolving at least a part of content of the buffer with the impulse train.

3. The method of claim 2, wherein convolving at least part of the content of the buffer with the impulse train comprises associating at least one of the past inputs with at least one impulse delay of the impulse train.

4. The method of claim 3, wherein associating at least one of the past inputs with at least one impulse delay comprises obtaining a magnitude of the at least one past input associated with the at least one impulse delay based on at least two constructive past inputs obtained at different times.

5. The method of claim 2, wherein providing the impulse train comprises providing impulses having associated impulse delays at different times.

6. The method of claim 5, wherein providing the impulses having associated impulse delays comprises splitting an impulse magnitude into at least two different times.

7. The method of claim 1, wherein the dynamic properties are obtained based on at least one of:
the input signal;
the modified input signal; or
at least one sensor reading indicating a property of the physical system.

8. The method of claim 1, wherein the input signal is indicative of at least one of:
a position of at least a part of the physical system;
a velocity of at least a part of the physical system;
an acceleration of at least a part of the physical system;
a torque of at least a part of the physical system;
a force of at least a part of the physical system; or
a current of at least part of the physical system.

9. The method of claim 1, wherein the dynamic properties are indicative of at least one of:
a damping ratio of the physical system;
a natural frequency of the system; or
a damped natural frequency of the physical system.

10. A robot comprising robot joints, where a robot joint comprises a joint motor, where the robot comprises a robot controller configured to control torque provided by the joint motor based on an input signal for the robot, and where the robot controller is configured to perform operations comprising:
at a time t, obtaining the input signal for the robot;
obtaining dynamic properties of the robot;
providing an impulse train based on the dynamic properties, where the impulse train comprises a number of impulses;
providing a modified input signal for the robot based on the input signal and the impulse train;
using the modified input signal for controlling the joint motor; and
storing an input based on the input signal in a buffer, the buffer also storing past inputs based on the input signal;
wherein the robot controller is configured to provide the modified input signal by convolving at least a part of content of the buffer with the impulse train; and
wherein impulses of the impulse train have an impulse magnitude and an associated impulse delay, and wherein the robot controller is configured to convolve the at least part of the content of the buffer with the impulse train by multiplying each impulse magnitude with one of the past inputs from the buffer, where a past input from buffer is received at a previous time $t_{previous}$ corresponding to the time t minus an impulse delay associated with an impulse.

11. The robot of claim 10, wherein the robot controller is configured to repeat the following operations at different times:
   obtaining the input signal for the robot;
   storing an input based on the input signal in the buffer;
   obtaining the dynamic properties of the robot;
   providing the impulse train based on the dynamic properties, the impulse train comprising a number of impulses; and
   providing a modified input signal for the robot by convolving at least a part of content of the buffer with the impulse train.

12. The robot of claim 11, wherein the robot controller is configured to associate at least one of the past inputs from the buffer with at least one of the impulse delays of the impulse train, and wherein the robot controller is configured to convolve at least part of the content from the buffer with the impulse train based on association of a past input from the buffer with an impulse delay of the impulse train.

13. The robot of claim 12, wherein the robot controller is further configured to provide the at least one past input associated with the impulse delay based on at least two past inputs from the buffer obtained at different times.

14. The robot of claim 11, wherein the robot controller is configured to associate at least one impulse delay with at least one of the different times.

15. The robot of claim 14, wherein the robot controller is configured to split at least one impulse magnitude into at least two split impulse magnitudes and to associate the at least two split impulse magnitudes with an equal number of different times.

16. The robot of claim 11, wherein the dynamic properties of the robot are obtained based on at least one of:
   the input signal;
   the modified input signal; or
   at least one sensor reading indicating a property of the robot.

17. The robot of claim 11, wherein the input signal is indicative of at least one of:
   a position of at least a part of the robot;
   a velocity of at least a part of the robot;
   an acceleration of at least a part of the robot;
   a torque or force of at least a part of the robot; or
   a current of at least a part of the robot.

18. The robot of claim 11, wherein the dynamic properties are indicative of at least one of:
   a damping ratio of the robot;
   a natural frequency of the robot; or
   a damped natural frequency of the robot.

19. A method of generating inputs to an actuator of a physical system, where the inputs comprise a position signal indicating a position of at least a part of the physical system and at least one position derivative signal indicating a derivative of the position, the method comprising:
   at a time t, obtaining the position signal;
   storing an input comprising at least part of the position signal in a buffer, where the buffer also stores inputs comprising at least parts of the position signal obtained at previous times;
   obtaining the at least one position derivative signal based on a numerical central difference differentiation that is based on at least two inputs from the buffer, where obtaining the at least one position derivative signal comprises obtaining a derivative signal at a time $t_{i-m}$ occurring before time $t_i$ by a numerical central difference differentiation that is based on:
      at least one input from the buffer obtained at a time $t_{i-n}$ before time $t_{i-m}$; and
      at least one input from the buffer obtained at a time $t_n$ after time $t_{i-m}$;
   wherein the inputs to the actuator comprise at least:
      the position signal obtained at time $t_{i-m}$; and
      the derivative signal obtained at time $t_{i-m}$; and
   wherein the derivative signal occurring at time $t_{i-m}$ is obtained at a time $t_{i-1}$ occurring one time-period before time t by a numerical central difference differentiation that is based on an input from the buffer obtained at time $t_i$ and an input from the buffer obtained at a time $t_{i-2}$ occurring, two time-periods before time $t_i$.

20. A method of generating inputs to an actuator of a physical system, where the inputs comprise a position signal indicating a position of at least a part of the physical system and at least one position derivative signal indicating a derivative of the position, the method comprising:
   at a time t, obtaining the position signal;
   storing an input comprising at least part of the position signal in a buffer, where the buffer also stores inputs comprising at least parts of the position signal obtained at previous times;
   obtaining the at least one position derivative signal based on a numerical central difference differentiation that is based on at least two inputs from the buffer, where obtaining the at least one position derivative signal comprises obtaining a first derivative signal at a time $t_{i-m}$ occurring before time $t_i$ by a numerical central difference differentiation that is based on:
      at least one input from the buffer obtained at a time $t_{i-n}$ before time $t_{i-m}$; and
      at least one input from the buffer obtained at a time $t_n$ after time $t_{i-m}$;
   wherein the inputs to the actuator comprise at least:
      the position signal obtained at time $t_{i-m}$; and
      the first derivative sional obtained at time $t_{i-m}$;
   obtaining a second derivative signal based on a numerical central difference differentiation that is based on at least three inputs from the buffer, wherein obtaining the second. derivative signal comprises:
   obtaining a derivative signal at a time $t_{i-o}$, occurring after time $t_{i-m}$ by a numerical central difference differentiation that is based on:
      at least one input from the buffer obtained at a time $t_{i-o+j}$ occurring after time $t_{i-o}$; and
   at least one input from the buffer obtained at a time $t_{i-o-j}$ occurring before time $t_{i-o}$, and
   obtaining a derivative signal at a time $t_{i-k}$ occurring before time $t_{i-m}$ by a numerical central difference differentiation that is based on:
      at least one input from the buffer obtained at a time $t_{i-k-j}$ occurring after time $t_{i-k}$; and
      at least one input from the buffer occurring at a time occurring before time $t_{i-k}$, and
   obtaining the second derivative signal occurring at time $t_{i-m}$ by a numerical central difference differentiation that is based on:
      the derivative signal at time $t_{i-o}$; and
      the derivative signal at time $t_{i-k}$; and
   wherein the second derivative signal comprises an input to the actuator at time $t_{i-m}$.

21. A method of generating inputs to an actuator of a physical system, where the inputs comprise a position signal indicating a position of at least a part of the physical system and at least one position derivative signal indicating a derivative of the position, the method comprising:
   at a time t, obtaining the position signal;
   storing an input comprising at least part of the position signal in a buffer, where the buffer also stores inputs comprising at least parts of the position signal obtained at previous times;
   obtaining the at least one position derivative signal based on a numerical central difference differentiation that is based on at least two inputs from the buffer, where obtaining the at least one position derivative signal comprises obtaining a first derivative signal at a time $t_{i-m}$ occurring before time $t_i$ by a numerical central difference differentiation that is based on:
      at least one input from the buffer obtained at a time $t_{i-n}$ before time $t_{i-m}$; and
      at least one input from the buffer obtained at a time $t_n$ after time $t_{i-m}$,
   wherein the inputs to the actuator comprise at least:
      the position signal obtained at time $t_{i-m}$; and
      the first derivative signal obtained at time $t_{i-m}$;
   obtaining a second derivative signal based on a numerical central difference differentiation that is based on at least three inputs from the buffer, wherein obtaining the second derivative signal comprises:
      obtaining, at time $t_{i-1/2}$, a derivative signal at time $t_{i-o}$ where time $t_{i-1/2}$ occurs a half time-period before time $t_i$, the derivative signal at time $t_{i-o}$ being obtained by a numerical central difference differentiation that is based on an input from the buffer at time $t_i$ and an input from the buffer at time $t_{i-1}$ occurring one time-period before time t;
      obtaining, at time $t_{i-3/2}$, a derivative signal at time $t_{i-k}$ where time $t_{i-3/2}$ occurs three half time-periods before time $t_i$, the derivative signal at time $t_{i-k}$ being obtained by a numerical central difference differentiation that is based on an input from the buffer at time $t_{i-2}$ occurring two time-periods before time $t_i$ and an input from the buffer at time $t_{i-1}$ occurring one time-period before time t; and
   wherein the second derivative signal at time $t_{i-m}$ is obtained at time $t_{i-1}$ occurring one time-period before time $t_i$ by a numerical central difference differentiation that is based on the derivative signal at time $t_{i-o}$ and the derivative signal at time $t_{i-k}$; and
   wherein the second derivative signal comprises an input to the actuator at time $t_{i-1}$ occurring one time-period before time $t_i$.

22. A robot comprising a plurality of robot joints, where a robot joint comprises a joint motor, where the robot comprises a robot controller configured to control the joint motor based on inputs comprising a position signal indicating a position of at least a part of the robot and at least one position derivative signal indicating a derivative of the position, where the robot controller is configured to perform operations comprising:
   at a time $t_i$ obtaining the position signal;
   storing an input based on the position signal in a buffer, where the buffer also stores inputs based on the position signal obtained at previous times;
   obtaining the at least one position derivative signal based on a numerical central difference differentiation that is based on at least two of inputs from the buffer, where obtaining the at least one position derivative signal comprises obtaining a derivative signal at a time $t_{i-m}$ occurring before time $t_i$ by a numerical central difference differentiation that is based on:
      at least one input from the buffer obtained at a time $t_{i-n}$ occurring before time $t_{i-m}$; and
      at least one input from the buffer obtained at a time $t_{i-1}$ occurring after time $t_{i-m}$; and
   wherein the robot controller is configured to control the joint motor based on at least:
      the position signal obtained at a time $t_{i-m}$ occurring before time $t_i$; and
      the derivative signal at time $t_{i-m}$;
   wherein the derivative signal at time $t_{i-m}$ is obtained at a time $t_{i-1}$ occurring one time-period before time $t_i$ by a numerical central difference differentiation that is based on an input from the buffer obtained at time $t_i$ and an input from the buffer obtained at a time $t_{i-2}$ occurring two time-periods before time $t_i$.

23. A robot comprising a plurality of robot joints, where a robot joint comprises a joint motor, where the robot comprises a robot controller configured to control the joint motor based on inputs comprising a position signal indicating a position of at least a part of the robot and at least one position derivative signal indicating a derivative of the position, where the robot controller is configured to perform operations comprising:
   at a time $t_i$, obtaining the position signal;
   storing an input based on the position signal in a buffer, where the buffer also stores inputs based on the position signal obtained at previous times;
   obtaining the at least one position derivative signal based on a numerical central difference differentiation that is based on at least two of inputs from the buffer, where obtaining the at least one position derivative signal comprises obtaining a first derivative signal at a time $t_{i-m}$, occurring before time $t_i$ by a numerical central difference differentiation that is based on:
      at least one input from the buffer obtained at a time $t_{i-n}$ occurring before time $t_{i-m}$; and
      at least one input from the buffer obtained at a time $t_{i-1}$ occurring after time $t_{i-m}$, and
   wherein the robot controller is configured to control the joint motor based on at least:
      the position signal obtained at a time $t_{i-m}$ occurring before time $t_i$; and
      the first derivative signal at time $t_{i-m}$;
   wherein the robot controller is configured to obtain a second derivative signal based on a numerical central difference differentiation that is based on at least three inputs from the buffer, wherein the robot controller is configured to perform operations comprising:
   obtaining a derivative signal at a time $t_{i-o}$ occurring before time $t_{i-m}$ by a numerical central difference differentiation that is based on:
      at least one input from the buffer obtained at a time $t_{i-o-j}$ occurring after time $t_{i-o}$; and
      at least one input from the buffer obtained at a time $t_{i-o-j}$ occurring before time $t_{i-o}$, and
   obtaining a derivative signal at a time $t_{i-k}$ occurring before time $t_{i-m}$ by a numerical central difference differentiation that is based on:
      at least one input from the buffer obtained at a time $t_{i-k+j}$ occurring after a time $t_{i-k}$; and
      at least one input from the buffer obtained at a time $t_{i-k-j}$ occurring before time $t_{i-k}$; and obtaining the second derivative signal at a time $t_{i-m}$ by a numerical central difference differentiation that is based on the derivative signal at time $t_{i-o}$ and the derivative signal at time $t_{i-k}$;

wherein the robot controller is configured to control the joint motor based on the second derivative signal occurring at time $t_{i-m}$.

24. A robot comprising a plurality of robot joints, where a robot joint comprises a joint motor, where the robot comprises a robot controller confi tired to control the joint motor based on inputs comprising a position signal indicating a position of at least a art of the robot and at least one position derivative signal indicating a derivative of the position. where the robot controller is configured to perform operations comprising:

at a time $t_i$, obtaining the position signal;

storing an input based on the position signal in a buffer, where the buffer also stores inputs based on the position signal obtained at previous times;

obtaining the at least one position derivative signal based on a numerical central difference differentiation that is based on at least two of inputs from the buffer, where obtaining the at least one position derivative signal comprises obtaining a first derivative signal at a time $t_{i-m}$ occurring before time $t_i$ by a numerical central difference differentiation that is based on:

at least one input from the buffer obtained at a time occurring before time $t_{i-m}$; and at least one input from the buffer obtained at a time occurring after time $t_{i-m}$, and wherein the robot controller is configured to control the joint motor based on at least:

the position signal obtained at a time occurring before time $t_i$; and the first derivative signal at time $t_{i-m}$;

obtaining a second derivative signal based on a numerical central difference differentiation that is based on at least three inputs from the buffer, wherein obtaining the second derivative signal comprises:

obtaining, at time $t_{i-1/2}$, a derivative signal at a time instant $t_{i-o}$ where time instant $t_{i-1/2}$ occurs a half time-period before time $t_i$, the derivative signal at time $t_{i-m}$ being obtained by a numerical central difference differentiation that is based on an input from the buffer obtained at time $t_i$ and an input from the buffer obtained as the time $t_{i-1}$ occurring one time-period before time $t_i$; and obtaining, at time $t_{i-3/2}$, a derivative signal at a time $t_{i-k}$ where time $t_{i-3/2}$ occurs three half time-periods before time $t_i$, the derivative signal at time $t_{i-k}$ being obtained by a numerical central difference differentiation that is based on an input from the buffer obtained at time $t_{i-2}$ occurring two time-periods before time $t_i$ and an input from the buffer obtained at time $t_{i-1}$ occurring one time-period before time $t_i$;

wherein the second derivative signal at a time $t_{i-m}$ is obtained at time $t_{i-1}$ occurring one time-period before time $ti$ by a numerical central difference differentiation that is based on the derivative signal at time $t_i$ and the fourth derivative signal at time $t_{i-k}$; and wherein the robot controller is configured to control the joint motor based on the second derivative signal at time $t_{i-1}$ occurring one time-period before time $t_i$.

\* \* \* \* \*